(12) United States Patent
Hayashigawa et al.

(10) Patent No.: US 8,299,754 B2
(45) Date of Patent: Oct. 30, 2012

(54) STORED ENERGY AND CHARGING APPLIANCE

(75) Inventors: Larry Hayashigawa, Orange, CA (US); Tim Conver, Chatsworth, CA (US); Tyler MacCready, Pasadena, CA (US); Thomas Zambrano, Long Beach, CA (US); Kent Steven West, Claremont, CA (US)

(73) Assignee: Aerovironment, Inc., Monrovia, CA (US)

( * ) Notice: Subject to any disclaimer, the term of this patent is extended or adjusted under 35 U.S.C. 154(b) by 69 days.

(21) Appl. No.: 12/854,821

(22) Filed: Aug. 11, 2010

(65) Prior Publication Data

US 2011/0055037 A1    Mar. 3, 2011

Related U.S. Application Data

(60) Provisional application No. 61/259,077, filed on Nov. 6, 2009, provisional application No. 61/233,087, filed on Aug. 11, 2009.

(51) Int. Cl.
*H02J 7/00* (2006.01)
*B60L 9/00* (2006.01)
(52) U.S. Cl. ............................ 320/109; 320/104; 701/22
(58) Field of Classification Search .................. 320/109, 320/104
See application file for complete search history.

(56) References Cited

U.S. PATENT DOCUMENTS

| 5,202,617 | A |  | 4/1993 | Nor |
| 5,803,215 | A |  | 9/1998 | Henze et al. |
| 5,847,537 | A |  | 12/1998 | Parmley, Sr. |
| 6,232,743 | B1 | * | 5/2001 | Nakanishi ..................... 320/104 |
| 6,371,230 | B1 | * | 4/2002 | Ciarla et al. ................. 180/68.5 |
| 6,614,204 | B2 | * | 9/2003 | Pellegrino et al. ........... 320/109 |
| 7,256,516 | B2 |  | 8/2007 | Buchanan et al. |
| 7,259,664 | B1 | * | 8/2007 | Cho et al. .................... 340/450.2 |
| 2006/0028178 | A1 |  | 2/2006 | Hobbs |
| 2006/0060236 | A1 | * | 3/2006 | Kim .............................. 136/203 |
| 2009/0079389 | A1 | * | 3/2009 | Ohtomo ........................ 320/109 |
| 2009/0082957 | A1 | * | 3/2009 | Agassi et al. ................. 701/208 |
| 2009/0313174 | A1 | * | 12/2009 | Hafner et al. .................... 705/80 |
| 2010/0145717 | A1 | * | 6/2010 | Hoeltzel ........................ 705/1.1 |
| 2010/0161482 | A1 | * | 6/2010 | Littrell ........................... 705/40 |

OTHER PUBLICATIONS

International Search Report for Serial No. PCT/US2010/045235 dated Oct. 6, 2010.

* cited by examiner

*Primary Examiner* — M'baye Diao
(74) *Attorney, Agent, or Firm* — Michael Blaine Brooks, PC; Pejman Yedidsion; Eric Aagaard

(57) ABSTRACT

A charging system detachably drawing from a power source comprising: (a) an electrical output configuration; (b) an electrical input configuration; and (c) an energy store configuration; and methods of provisioning the energy store, the charging system, and electric vehicle charger devices.

39 Claims, 16 Drawing Sheets

STORED ENERGY AND CHARGING APPLIANCE

CROSS-REFERENCE TO RELATED APPLICATIONS

This application claims the benefit of U.S. Provisional Application No. 61/259,077, filed Nov. 6, 2009, and this application also claims the benefit of U.S. Provisional Application No. 61/233,087, filed Aug. 11, 2009, the disclosures of which are incorporated by reference herein for all purposes.

TECHNICAL FIELD

The invention, in its several embodiments, pertains to systems and methods for storing and providing electrical power, and more particularly to devices for, and methods of, charging battery-based devices or powering electrical devices via a limited electrical supply.

BACKGROUND

Electric vehicles (EVs) having chemical battery-based energy stores may be recharged via an outlet to a power grid. A specification standard, SAE J1772, defines several levels of charging: level 1 charging is a method that employs a 120 volt, single-phase, power line via a residential electrical grounded outlet. Level 2 is a method of charging that provides more power for charging than level 1, but requires Electric Vehicle Support Equipment (EVSE). An EVSE, as defined by the National Electrical Code (NEC), is typically sited at a fixed location and wired to a single phase 240 volt power line of alternating current (i.e., 240 VAC). The EVSE provides grounding, ground fault protection, a charging cable and vehicle connector assembly, and a no-load make/break interlock to prevent arcing if the connector is disconnected while under charge. DC (level 3) charging employs an off-board charger that converts AC to DC for high power charging. The high power in level 3 charging may draw from three-phase electrical service such as a 480 volt, three-phase electric service.

SUMMARY

Some embodiments of the present invention include charging systems, attached or detachable, drawing from a power source, where an exemplary charging system comprises: (a) an electrical output configuration; (b) an electrical input configuration; and (c) an energy store configuration. For example, an exemplary device, or charging system, may comprise: (a) an electrical input configured to detachably connect to a power source; (b) an electrical output module, or charger, configured to charge an electric vehicle; and (c) an energy store. The output module may be further configured to convert direct current from the energy store to alternating current. The output module may be further configured to condition the direct current from the energy store to a higher powered direct current. The energy store of an exemplary charging system embodiment may comprise one or more lead-acid batteries and/or lithium-ion batteries. The energy store embodiments may comprise one or more modules disposed on a heat sinking surface, such as a concrete floor, where each module may comprise a reversible chemical energy store, the energy store comprising at least one of: a lead-acid battery and a lithium-ion battery or lead-acid battery. The energy store of an exemplary charging system embodiment may comprise a plurality of capacitors or a flywheel driving a DC motor. The energy store of an exemplary charging system embodiment may comprise a fuel cell. An exemplary charging system, or a charging module of the charging system, may further comprise a processor configured to monitor at least one of current and voltage within at least one circuit of the charging system. An exemplary charging system may further comprise a processor configured to monitor an energy store level and communicate the monitored energy store level to a display. An exemplary charging system, or a charging module of the charging system, may further comprise a processor configured to monitor an energy store level and communicate the monitored energy store level to a wireless transmitter. The charger or charger module of an exemplary charging system may be detachable from the charging system and configured for installation as a charging module wired to a power line of a residential or commercial power grid.

Charging system embodiments may comprise: (a) a first charger, wherein the charging system is configured to store energy supplied from a power source of a first power level and wherein the first charger is configured to supply power to an electric vehicle (EV) at a second power level greater than the first power level, and may further comprise a second charger configured to charge the EV at a power level greater than the first power level.

Method embodiments may include methods of: (a) providing for a location of charging a charging system, where the charging system may comprise a first charger that may be configured to be detachable from the charging system, and the charging system may be configured to be detachably connectable to a first power source, configured for storing energy, and configured for providing power, via for example a first charging unit, to charge an electric vehicle (EV) greater than at least one of: (i) a power level and (ii) a recharge rate over time, relative to the EV drawing directly from the first power source at the location of charging; (b) providing at the location of charging a second power source, and at least one of: (a) the first charger detached from the charging system, and (b) a second charger, where the second charger is configured to charge the EV greater than at least one of: (i) a power level and (ii) a recharge rate over time, relative to the EV drawing directly from the first power source at the location of charging. The exemplary method may further include purchasing or leasing the electric vehicle to be charged at the location of charging, and/or may further include removing the charging system from the location of charging, e.g., after providing the second charger or after detaching the first charger. The first charger of the charging system may be part of a detachable charging module, e.g., a detachable level 2 AC-to-DC charging module or a detachable EVSE, where the detachable level 2 AC-to-DC charging module may be removed from the charging system, and may be wired to an AC power line, e.g., a power line proximate to the location of charging, and then the detached and wired charging module may be used for EV charging instead of a second charger or second EVSE. Thereafter, the charging system, absent the detached level 2 AC-to-DC charging module, may be removed from the location of charging. The detachable charging module may further comprise a processor, memory store, and may further comprise a user interface.

Method embodiments may include methods of provisioning and/or using the charging system. For example, an exemplary method embodiment may comprise: (a) providing an apparatus, or charging system, to a subscriber, the charging system comprising: (i) an electrical input configured to detachably connect to a power source; (ii) an electrical output module configured to charge an electric vehicle; and (iii) an energy store; (b) determining payment obligations of the subscriber for use of the provided apparatus; and (c) withdrawing the apparatus based on a termination condition.

Embodiments may include exemplary methods of: (a) providing or delivering to a user location a charging system, where the charging system is configured to store power supplied from a power source of a first power level and configured to be capable of supplying power, e.g., via a first charger, to the EV at a second power level greater than the first power level; (b) providing or delivering to the user location at least one of: (i) the first charger detached from the charging system and a second charger capable of charging the EV at a power level greater than the first power level, and optionally (c) removing the first charger from the user location. The exemplary method may further include the step of transferring possession of the EV to the user. The step of transferring possession of the EV to the user of the exemplary method may include at least one of: (a) possession via a lease instrument; (b) possession via a bill of sale; and/or (c) possession via a bailment. The exemplary method embodiment may employ a charging system configured to store energy supplied from a 110 VAC power line, a 120 VAC power line, a 220 VAC power line, and/or a 240 VAC line, and the charging system may be further configured to supply power to the EV, via for example a first charger, via at least one of: (a) level 2 AC-to-DC charging ranges; and (b) level 3 DC-to-DC charging ranges. The first charger of the charging system may be part of a detachable charging module, e.g., a detachable level 2 AC-to-DC charging module or a detachable EVSE, where the detachable level 2 AC-to-DC charging module may be removed from the charging system and be wired to an AC power line. Thereafter, the charging system, absent the detached level 2 AC-to-DC charging module, may be removed from the user location.

In other embodiments, a charging system may be connected to a power source, wherein the power source is capable of providing sufficient power to charge an electric vehicle in a first period of time, comprising: an energy store electrically connected to the power source, such that the energy store may store power provided by the power source; a charger electrically connected to the energy store, wherein the charger is capable of providing sufficient power to charge the electric vehicle in a second period of time; and wherein the second period of time is shorter than the first period of time. Additionally, the charging system may have an energy store that comprises a reversible chemical energy store, that may comprise at least one of: a lead-acid battery and a lithium-ion battery or lithium-ion or lead-acid battery. The energy store may also comprise one or more modules disposed on a heat sinking surface, each module comprising a reversible chemical energy store, wherein the energy store may comprise at least one of: a lead-acid battery and a lithium-ion battery or lithium-ion or lead-acid battery. In other embodiments, the charging system may have a power source that provides power via at least one of: between about 110 volts and 120 volts or about 120 volts and about 16 amps or about that of a common United States grounded household receptacle or about 16.8 kW or alternating current, and the charger is capable of providing power to the electric vehicle at least one of: a voltage between about 208 volts and 240 volts or between about 208 volts and 240 volts and between about 12 amps and about 80 amps or between more than 16.8 kW and about 44 kW or alternating current. Additionally, the charging system power source may provide power via at least one of: a voltage between about 208 volts and 240 volts or between about 208 volts and 240 volts and between about 12 amps and about 80 amps or between more than 16.8 kW and about 44 kW or alternating current, and the charger is capable of providing power to the electric vehicle at least one of: a voltage between about 300 and 500 volts or a voltage of about 480 volts or a current at about up to 400 amps or about 62.5 kW or direct current.

BRIEF DESCRIPTION OF THE DRAWINGS

Embodiments of the present invention are illustrated by way of example and not limitation in the figures of the accompanying drawings, and in which.

DETAILED DESCRIPTION

Figure 1A:
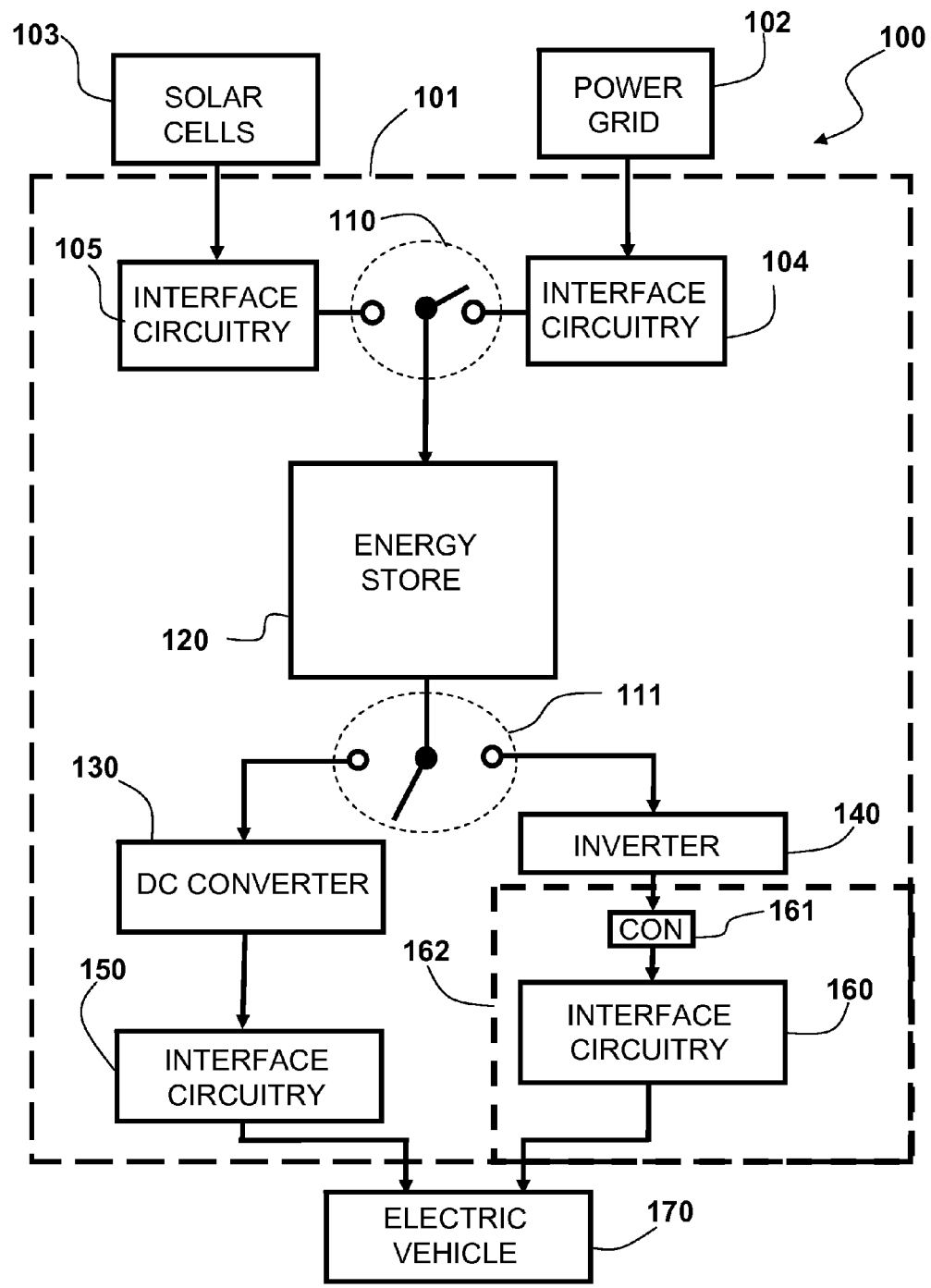
FIG. 1A depicts an exemplary functional block diagram of an embodiment of the present invention.

Embodiments of the present invention may be disclosed by example as devices, systems, and methods. Exemplary embodiments include charging systems comprising an energy store and an electric vehicle charger, where the charging system is attached or detachable and draws from a power source. Exemplary method embodiments of the present invention include methods of provisioning charging systems detachably drawing from a power source and electric vehicle chargers.

Exemplary Device and System Embodiments

Exemplary apparatus embodiments of a charging system detachably drawing from a power source include a system comprising: (a) an electrical output configuration; (b) an electrical input configuration; and (c) an energy store configuration.

A. Electrical Output Configurations or Modules

1. Alternating Current (AC) Charging

An exemplary electrical output configuration or module may include an inverter drawing from an energy store, e.g., a two to fifty kilowatt-hour chemical battery, and outputting alternating current, e.g., 220 VAC. Conditioning circuitry and logic may be disposed between the output of the inverter and the electric vehicle charging port. Exemplary electric vehicle supply equipment (EVSE) may be sized to accommodate a predetermined level of power, e.g., 3.3 kilowatts or 6.6 kilowatts. Accordingly, an exemplary electrical output configuration may include a 6.6 KW inverter.

In some embodiments the electrical output of the output module may be a voltage between about 208 volts and 240 volts, with a current of between about 12 amps and about 80 amps, between more than 16.8 kW and about 44 kW, and/or of alternating current. In other embodiments the electrical output of the output module may be a voltage between about 300 and 500 volts, a voltage of about 480 volts, a current at about up to 400 amps, about 62.5 kW and/or direct current.

The EVSE module may be configured to be removable or detachable from the charging system, and the EVSE module may be wired to the power line available at the charging or user's location. For example, the EVSE may be mountable and wired as a permanently mounted fixture at a user's charging site. Accordingly, the EVSE module may be removed from a charger device and the EVSE may be wired as a wall-mounted unit to a power line, such as a 240 VAC powerline. The EVSE module may include a memory store where the memory store may store charging history, billing history, encryption, and user-specific designated keys and/or settings. Generally, the EVSE user interface may be common to both the EVSE when integrated with a charging system and the EVSE when wired to a power line. A subset or superset of the functionality of the user interface, e.g., buttons, keypad, indicator lights, switches, and touch-pad enabled graphic user interface icons, and their customary meaning and sequence of use, may be present in both the charger-installed EVSE and the wall-mounted EVSE, thereby maintaining the effectiveness and comfort-of-use for a user familiar with the charger-mounted EVSE now interacting or viewing the same EVSE as a wall-mounted unit.

2. Direct DC Charging

An exemplary electrical output configuration or module may include a DC-to-DC converter drawing from an energy store, e.g., a five to ten kilowatt-hour chemical battery, and outputting direct current at a predetermined level of power, e.g., 20-30 kilowatts.

3. Direct DC and/or AC Charging

An exemplary electrical output configuration or module may include both AC charging and direct DC charging, where the electric vehicle may be charged via one of the two available means of charging. Selection of the means of charging may be based on user input and/or a selection of a charging cable of the apparatus.

4. Optional Return to the Grid

An exemplary electrical output configuration or module may include an inverter drawing from an energy store, e.g., a two to fifty kilowatt-hour chemical battery, and outputting alternating current, e.g., 220/240 VAC or 110/120 VAC. Conditioning circuitry and logic may be disposed between the output of the inverter and the port/outlet to the power grid. Conditioning circuitry and logic may be disposed between the output of the inverter and the port/outlet to a local residential wiring circuit to power at least a portion of the electrical devices of a residence.

B. Electrical Input Configurations

1. Electrical Grid

Exemplary power input configurations may include connecting to a residential 110 VAC draining 15-20 Amps or 220 VAC or 120 VAC and 240 VAC.

2. Solar Cells and Other Off-Grid Sources

Exemplary power input configurations may include connecting to the output of solar cells and/or fuel cells.

3. Electrical Vehicle Batteries May Be Tapped as Power Sources for Short-Term Powering of a Local Power Grid.

C. Energy Store Configurations

Exemplary energy store configurations or modules include: chemical media, e.g., chemical batteries and fuel cells; electrical media, e.g., capacitor banks; mechanical media, e.g., a flywheel and an alternator assembly; and combinations of media.

1. Electrochemical: Batteries

Exemplary energy store configurations comprising one or more electrochemical batteries may include lead-acid batteries, lithium-ion (Li-ion) batteries or sealed lead-acid batteries, and may include other rechargeable batteries such as nickel-metal-hydride (NiMH), Nickel-Zinc (NiZn), and nickel-cadmium (NiCD) batteries. For example, a sealed electrochemical battery may store five to ten kilowatt-hours of power.

The exemplary two or more electrochemical batteries may be arranged in an array or matrix and may be disposed in a housing. The housing may be configured as a tower or box, and may be configured in a planar array that may be expanded to cover at least a portion of the footprint of an electric vehicle.

The exemplary batteries may be selected from batteries that may qualify as electric vehicle on-board batteries, or may be selected from batteries that failed at least one on-board qualifying test, or may be selected from previously qualified batteries removed from an electric vehicle prior to exhausting an expected lifetime number of cycle charges due to less than specified energy capacity for use in an EV, but sufficient for energy storage for charging an EV. This method of moving the battery through various uses, i.e., a vehicle battery and a battery for a vehicle charger, may maximize the battery asset, and this method may lead to a lowering of the overall cost of the battery for EV applications.

2. Electrochemical: Fuel Cell

Exemplary energy store configurations comprising one or more electrochemical batteries include a hydrogen fuel cell.

3. Electrical: Capacitance

Exemplary energy store configurations may comprise high-energy-density capacitors having high dielectric breakdown strength.

4. Mechanical: Flywheel

Exemplary energy store configurations comprising a flywheel driven by electrical motor windings, a store when windings and magnets rotate together, and the system functioning as a power source when winding and magnets rotate relative to one-another—converting the flywheel angular momentum to alternating current or DC current depending on the motor/generator used.

5. Combinations of Energy Store Media

Exemplary energy store configurations may comprise combinations of electrochemical media, e.g., electrochemical batteries and fuel cells; electrical media, e.g., capacitor banks; mechanical media, e.g., a flywheel and an alternator assembly; and combinations of media.

Reference is made to the drawings that illustrate exemplary embodiments of the present invention. FIG. 1A depicts an exemplary functional block diagram of an embodiment of the present invention. The general system 100 is shown comprising a device 101, or charging system, that may draw power from a power grid 102 and/or solar cells 103, and/or other energy sources. Circuitry is shown interposed between the energy source 102, 103 and an energy store 120 where the interface circuitry 104 for the power grid input is an AC-to-DC converter and where the interface circuitry 105 for the solar cell input is a DC-to-DC converter. The charging system 101 may be configured via a first switch 110 to draw from the power provided by the solar cells and/or the power grid. In some embodiments, the first switch 110 may be replaced by an electrical summing module where the two or more power sources may be combined. The charging system 101 may be configured via a second switch 111 to provide power from the energy store 120 to an electric vehicle 170 or other device via either (a) an inverter 140 and interface circuitry 160, or (b) a DC converter 130 and interface circuitry 150. An EVSE is an example of interface circuitry 160 interposed between the inverter 140 and the electric vehicle 170. An EVSE may be part of a charger module 162 that may be detachably attached to the inverter 140 via a connector 161. The detachable EVSE module 162 may be: (a) removed or detached from the charging system 101; and (b) wired to a 240 VAC powerline. The detached module 162 may be attached to a support structure, such as a wall proximate to the location of charging.

Figure 1B:
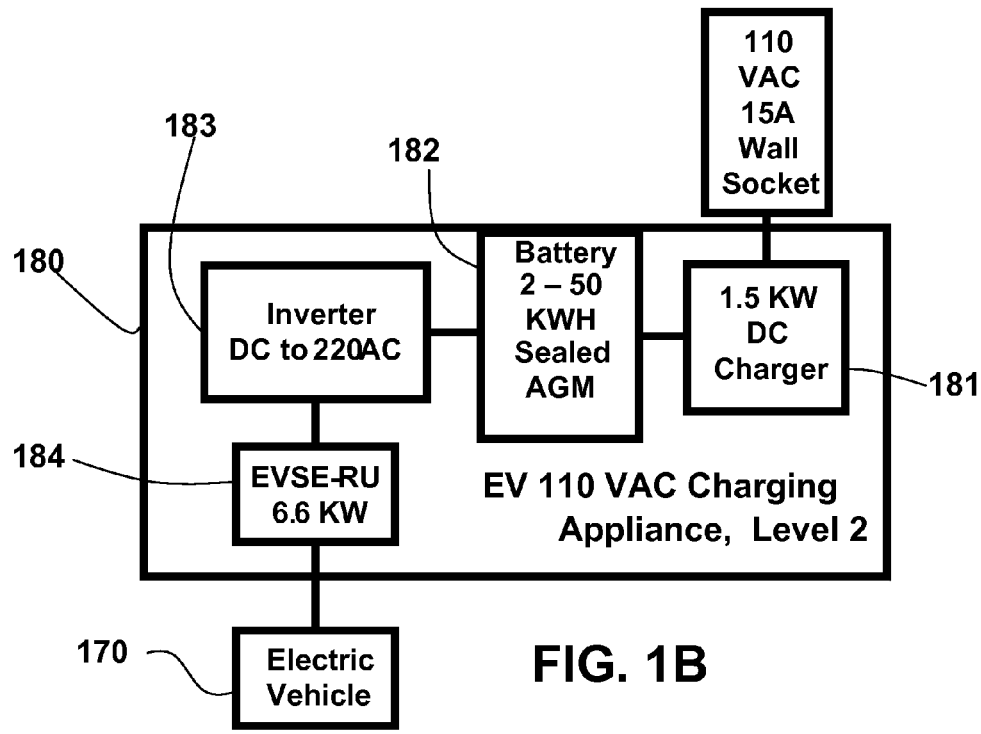
FIGS. 1B and 1C depict respectively exemplary direct current and alternating current charging appliance, or system, embodiments of the present invention.
Figure 1C:
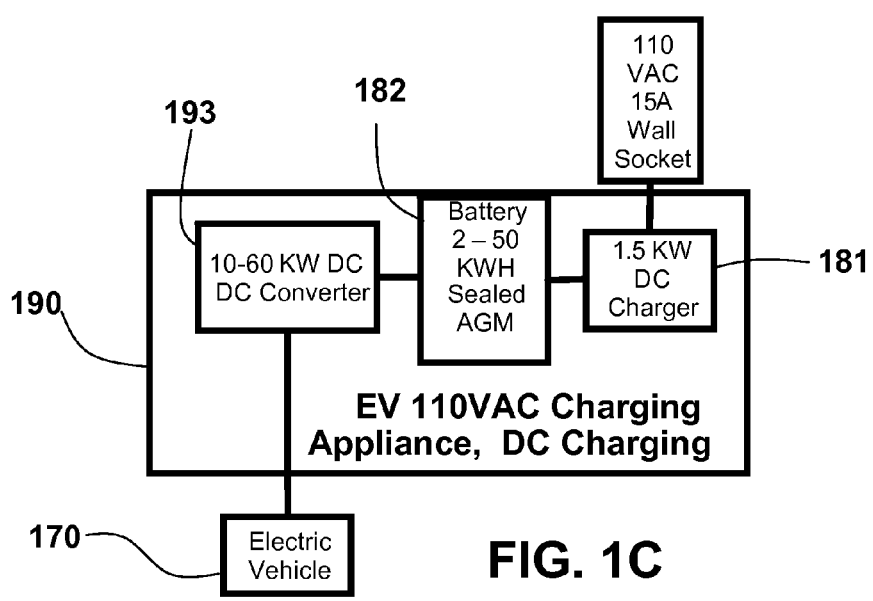

FIGS. 1B and 1C depict respectively exemplary level 2 and level 3 charging appliance or charging system embodiments of the present invention. Referring to FIG. 1B, an exemplary EV 170, level 2, charging appliance 180 is shown, by example, as comprising a 1.5 KW DC charger 181 configured to receive power from a 110 VAC, 15 amp, wall socket, and further configured to provide power to a 2-50 KWH battery 182. An inverter 183 is depicted as configured to draw current from the battery 182 and provide 220 VAC to an electric vehicle service equipment (EVSE) 184 rated at 6.6 KW. Referring to FIG. 1C, an exemplary EV 170, level 3, charging appliance 190 is shown, by example, as comprising a 1.5 KW DC charger 181 configured to receive power from a 110 VAC, 15 amp, wall socket, and further configured to provide power to a 2-50 KWH battery 182. A 10-60 KW DC-to-DC converter 193 is depicted as configured to draw current from the battery 182 and provide higher powered direct current to the electric vehicle 170.

Figure 2A:
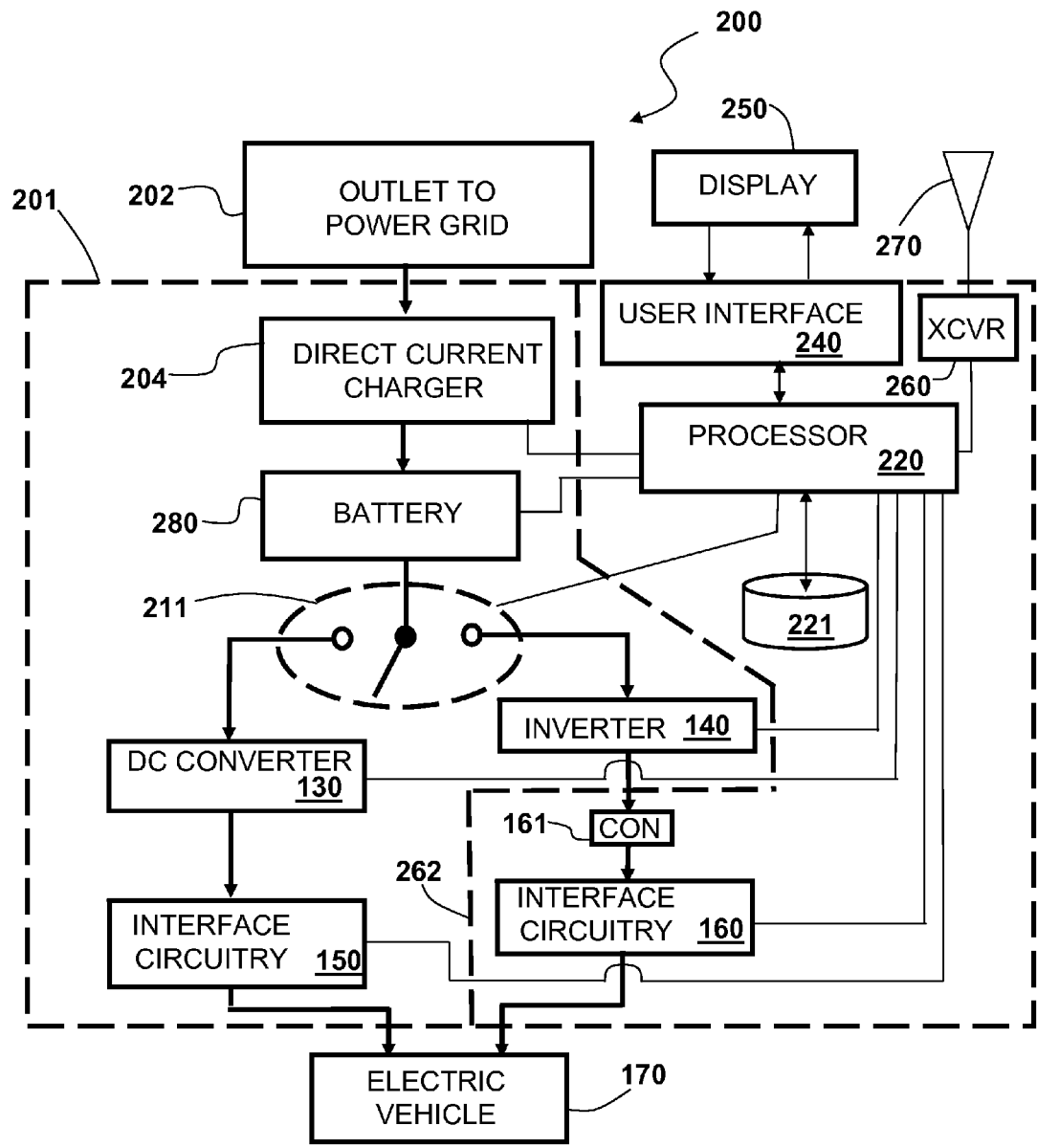
FIG. 2A depicts an exemplary functional block diagram of an embodiment of the present invention.
Figure 2B:
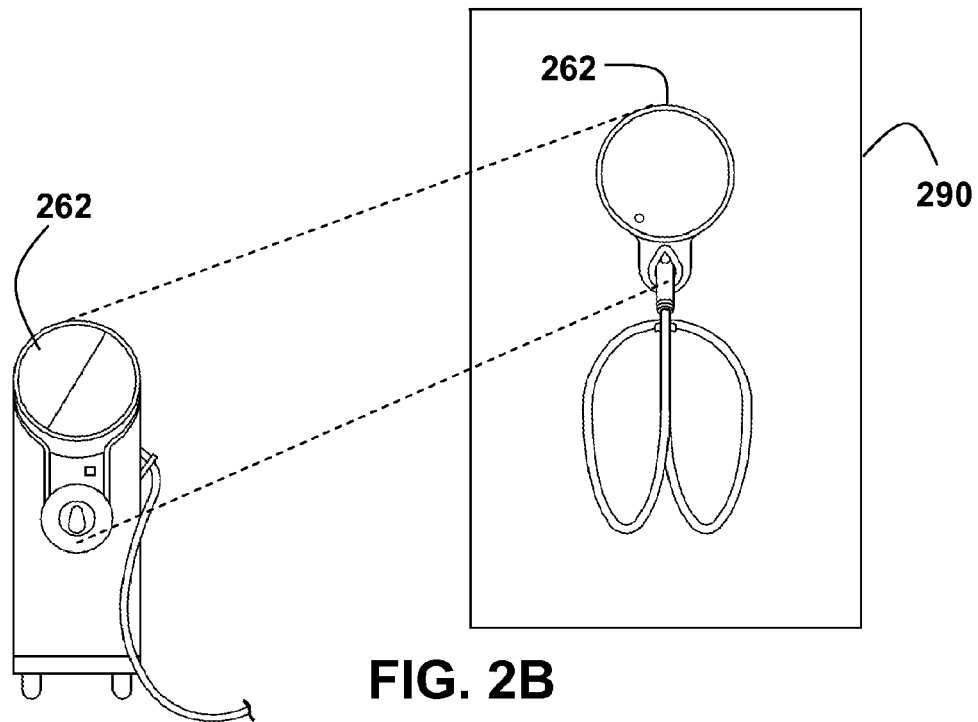
FIG. 2B depicts an Electric Vehicle Support Equipment (EVSE) as an exemplary charger that may be detached from the charging system and mounted on a support structure.
Figure 2C:
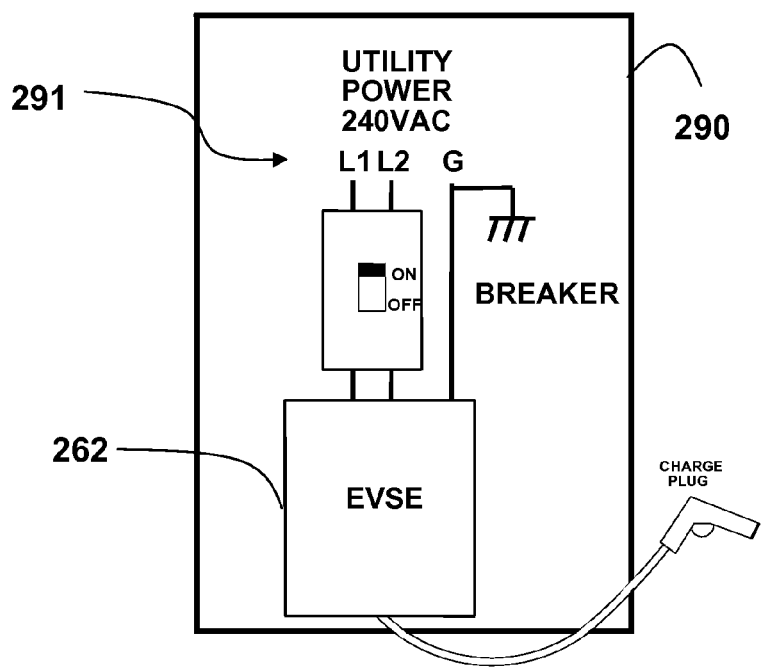
FIG. 2C depicts in a schematic a detachable EVSE of FIG. 2B wired to a 240 VAC power line.

FIG. 2A depicts an exemplary functional block diagram of an embodiment of the present invention. The exemplary general system shown 200 includes an outlet to the power grid 202 and an electric vehicle 170 receiving level 2 or level 3 (direct current charging) from an exemplary device 201 or charging system. A direct current charger 204 is shown interposed between the power grid outlet 202 and a battery 280, or plurality of batteries, and a switch 211 for directing the current from the battery to either a DC converter 130 or an inverter 140. In some embodiments, the switch 211 may be replaced by an electrical splitting module that divides the power to two or more paths. Also depicted in FIG. 2A is a processor 220 having a memory store 221, where the processor 220 is shown in communication with elements 204, 280, 211, 130, 140, 150, 160 of the exemplary device 201, and further in communication with a user interface 240 that may include a display 250, such as touch-screen display. The processor is also shown as optionally in communication with a transmitter or a transmitter/receiver element 260, i.e., a transceiver or XCVR, that may transmit and receive data via an antenna element 270. The exemplary processor 220 includes a central processing unit (CPU) and addressable memory where the CPU may be configured via computer-readable instructions, to monitor current and charge levels within the device and report portions of the monitored values to one or more external communication nodes via the XCVR 260 and antenna 270. The processor 220 may be further configured to read data stored in the data store 221, and output the read data to the XCVR 260 for transmitting to a remote site via the antenna 270. The interface circuitry 160 may be an EVSE and may be interposed between the inverter 140 and the electric vehicle 170, and may be detachably connected to the inverter via a connector 161, and the interface circuitry 160 the processor 220, memory store 220, user interface 240 and display 250 may comprise a detachable module 262, e.g., a charger, that: (a) may be removed from the device 201 and fixedly attached to a support structure, such as a wall; and (b) wired to an AC power source such as a 220-240 VAC power line. The processor 220, user interface 240, display 250, and optional transceiver 260 may be powered via a power supply (not shown) that may receive as input 120 VAC and/or 220 VAC, or may be powered via the direct current charger 204, or other rectifying circuit, and a voltage regulator (not shown). FIG. 2B depicts an EVSE of an exemplary charging unit 162 (FIG. 1A) or charger that may be detached from the charging unit 180 (FIG. 1B) or charging system, and mounted on a support structure 290. FIG. 2C depicts in a schematic the detachable EVSE 262 of FIG. 2B wired to a 240 VAC power line 291.

Figure 3A:
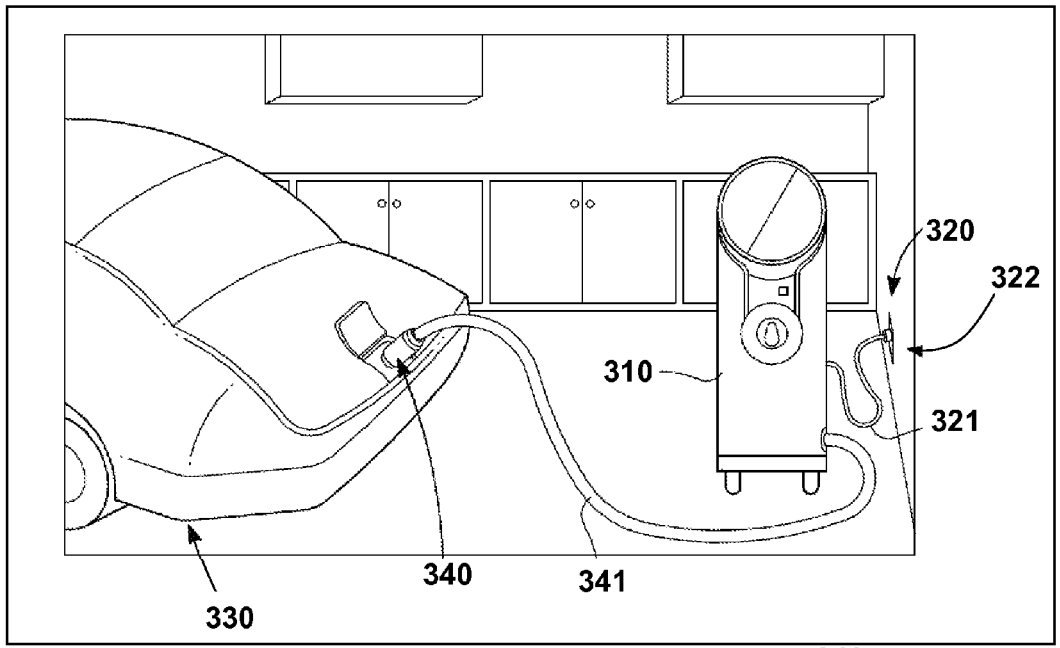
FIG. 3A depicts an exemplary charging system embodiment of the present invention connected to a power grid via an outlet and connected to an electric vehicle via a connector and cable.
Figure 3B:
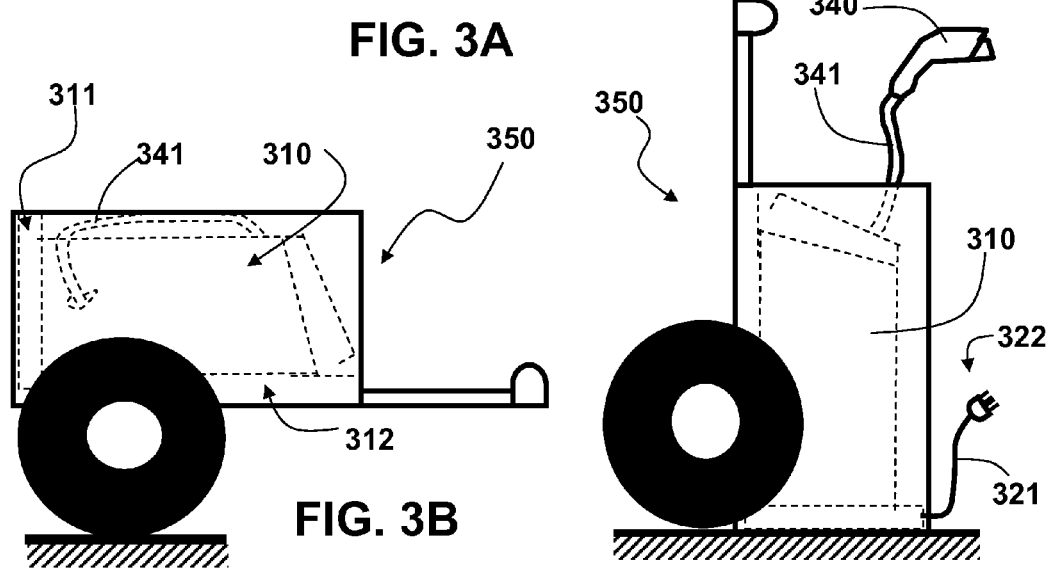
FIGS. 3B and 3C depict respectively a trailer-charger assembly in exemplary horizontal travel configuration and in an exemplary upright position.
Figure 3C:
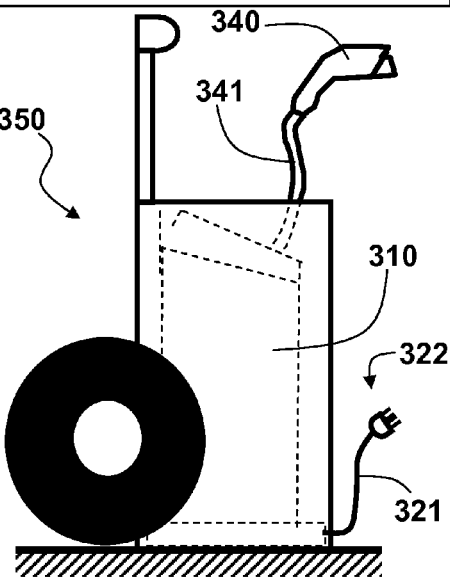

FIG. 3A depicts an exemplary charging system embodiment 310 of the present invention connected to a power grid via an outlet 320 and a power cord 321 and plug 322, and connected to an electric vehicle 330 via a connector 340 and charging cable 341. FIGS. 3B and 3C depict respectively a trailer-charger assembly in horizontal travel and in upright positions. Referring to FIG. 3B, an exemplary Lithium-ion battery-based charging unit 310 (FIG. 3A), is depicted in a horizontal orientation in a trailer 350. The charging unit 310 may be secured in a back cradle 312 and a footing 311 to minimize rattle and road shock. The charging cable 341 may be stowed or deployed. Referring to FIG. 3C, the exemplary Lithium-ion battery-based charging unit 310 (FIGS. 3A and 3B), is depicted in a vertical or upright orientation in the upended trailer 350. The charging cable connector 340 and charger cable 341 are depicted as deploying from the charger 310. The power cord 321 is shown deployed 322 from the charging unit 310.

Figure 4:
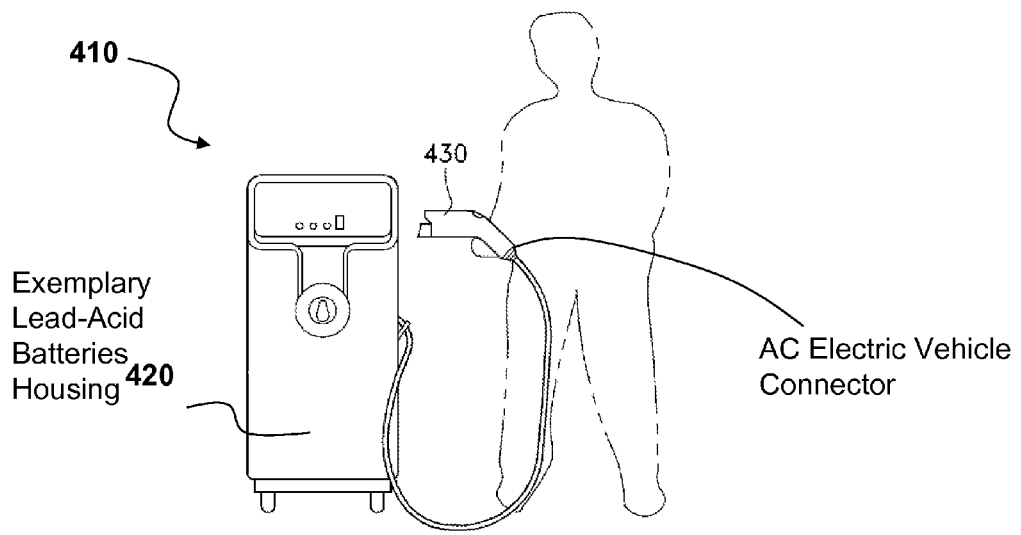
FIG. 4 depicts an exemplary charging system embodiment comprising a lead-acid batteries housing and an exemplary alternating current (AC) electric vehicle connector.

FIG. 4 depicts an exemplary device embodiment 410 comprising a lead-acid batteries housing 420 and an exemplary AC electric vehicle connector 430.

Figure 5:
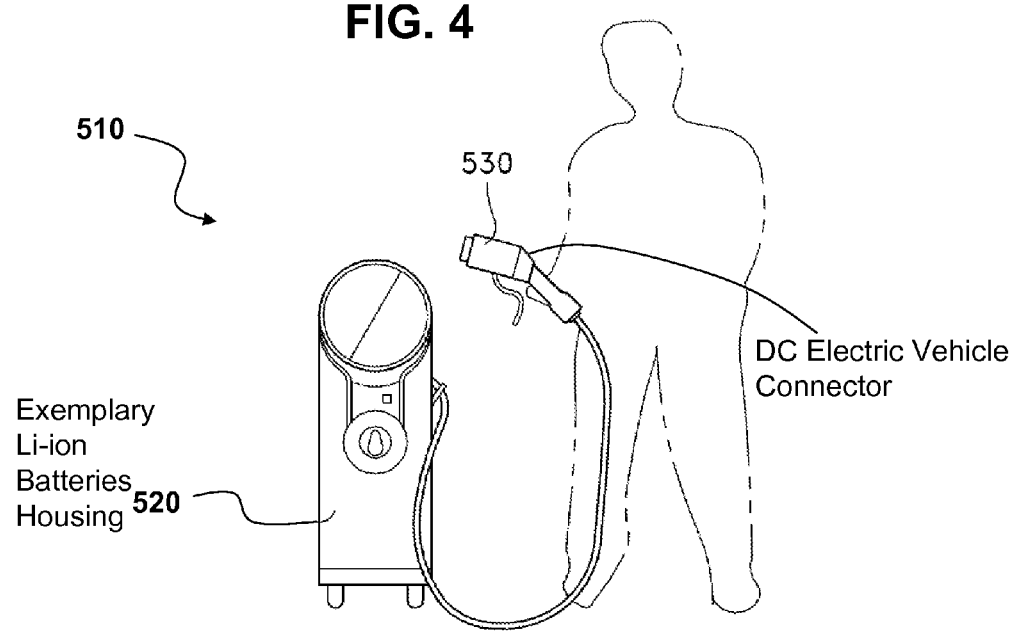
FIG. 5 depicts an exemplary charging system embodiment comprising a lithium-ion batteries housing and an exemplary direct current (DC) electric vehicle connector.

FIG. 5 depicts an exemplary device embodiment 510 comprising a lithium-ion batteries housing 520 and an exemplary DC electric vehicle connector 530.

Figure 6:
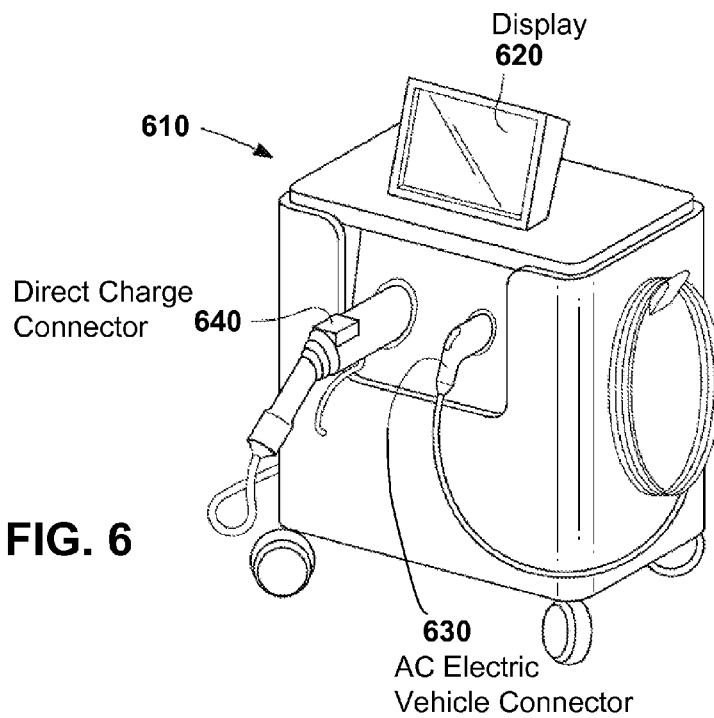
FIG. 6 depicts an exemplary charging system embodiment of the present invention comprising a touch-screen display and two connectors: an exemplary alternating current (AC) electric vehicle connector and a direct current (DC) vehicle connector.

FIG. 6 depicts an exemplary charging system embodiment 610 of the present invention comprising a touch-screen display 620 and two connectors: an exemplary SAE J1772-compliant electric vehicle connector 630 and a level 3 direct charge vehicle connector 640. The exemplary charging system of FIG. 6 may further comprise the configuration depicted in FIG. 1A and FIG. 2A.

Figure 7:
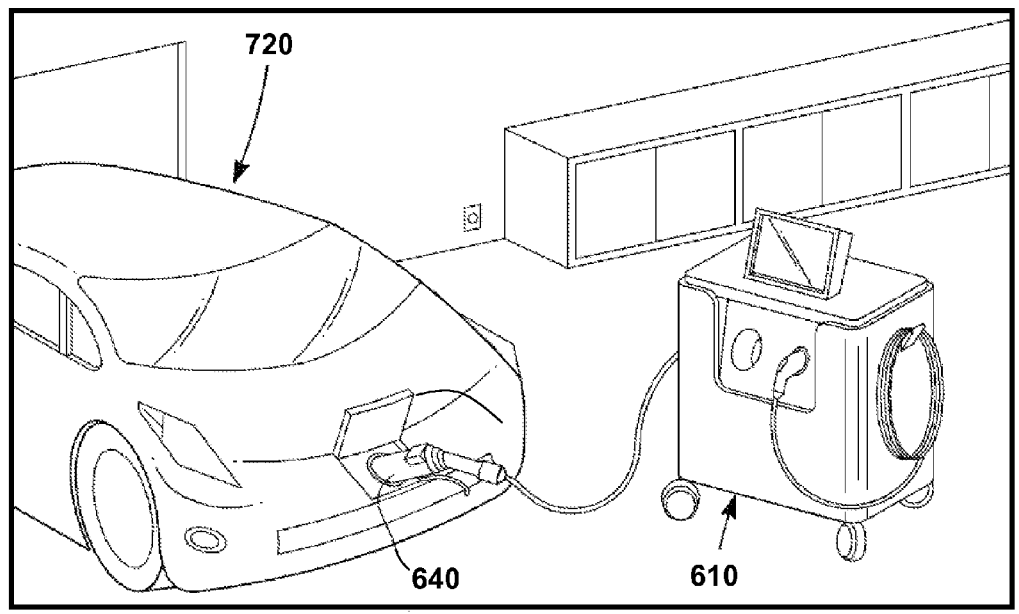
FIG. 7 depicts an exemplary charging system embodiment of the present invention connected to an electric vehicle via the exemplary direct current (DC) electric vehicle connector.

FIG. 7 depicts an exemplary charging system embodiment of the present invention 610 connected to an electric vehicle 720 via the exemplary direct charge vehicle connector 640.

Figure 8:
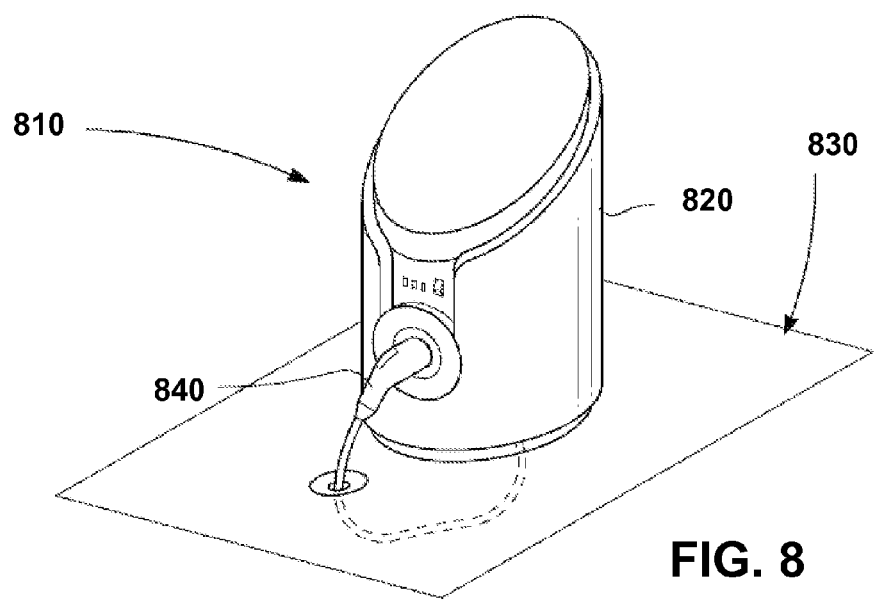
FIG. 8 depicts an exemplary charging system embodiment comprising a lithium-ion batteries housing disposed on a platform and an exemplary direct charge electric vehicle connector.

FIG. 8 depicts an exemplary charging system embodiment 810 comprising a lithium-ion batteries housing 820 disposed on a platform 830 and an exemplary direct charge electric vehicle connector 840.

Figure 9:
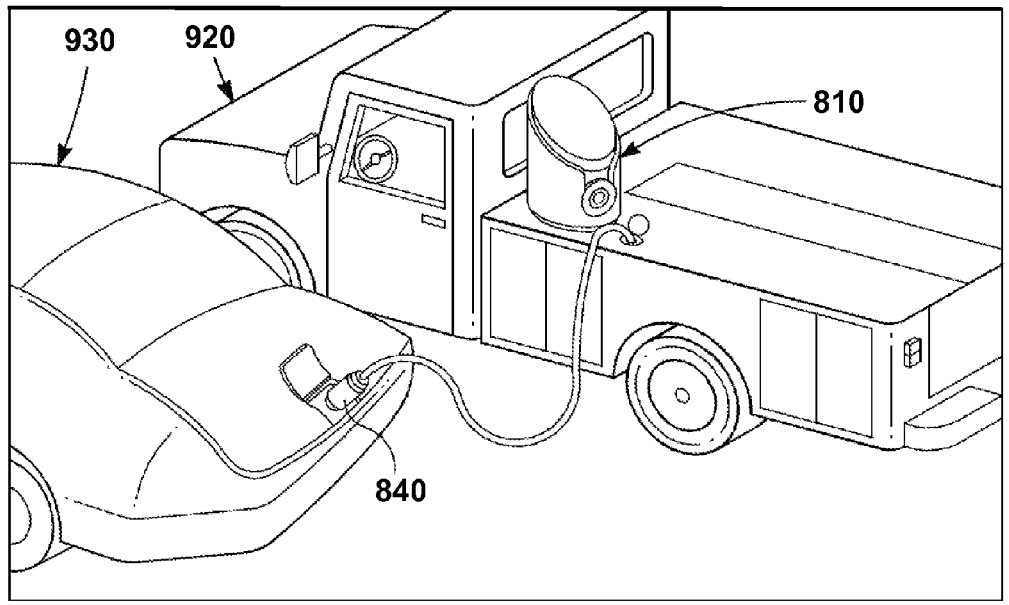
FIG. 9 depicts an exemplary charging system embodiment comprising a lithium-ion batteries housing of FIG. 8 mounted on a service vehicle and connected to an electric vehicle via an exemplary direct charge electric vehicle connector.

FIG. 9 depicts an exemplary charging embodiment 810 comprising a lithium-ion batteries housing of FIG. 8 mounted on a service vehicle 920 and connected to an electric vehicle 930 via an exemplary direct charge electric vehicle connector 840. In some embodiments, the exemplary charging system embodiment 810 may be disposed on a vehicle trailer and pulled by the service vehicle or an electric vehicle configured to tow such a trailer (see FIGS. 3B and 3C).

Figure 10:
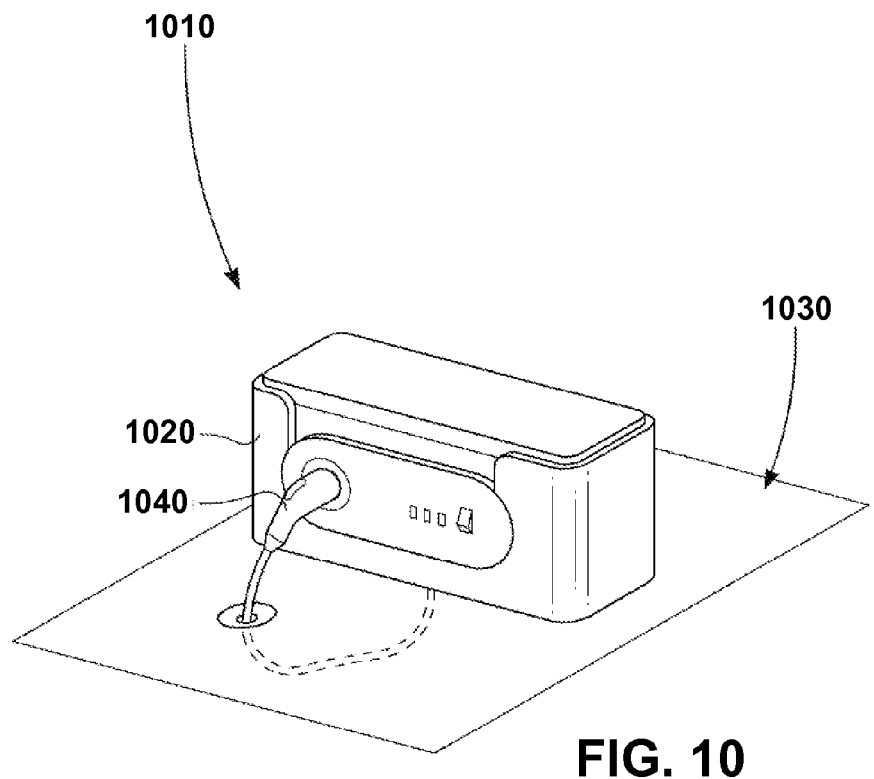
FIG. 10 depicts an exemplary charging system embodiment comprising a lead-acid batteries housing disposed on a platform and an exemplary direct charge electric vehicle connector.

FIG. 10 depicts an exemplary charging system embodiment 1010 comprising a lead-acid batteries housing 1020 disposed on a platform 1030 and an exemplary direct charge electric vehicle connector 1040. The exemplary charging system 1010 may be used in place or in addition to the lithium-ion battery device 810 of FIG. 8.

Figure 11:
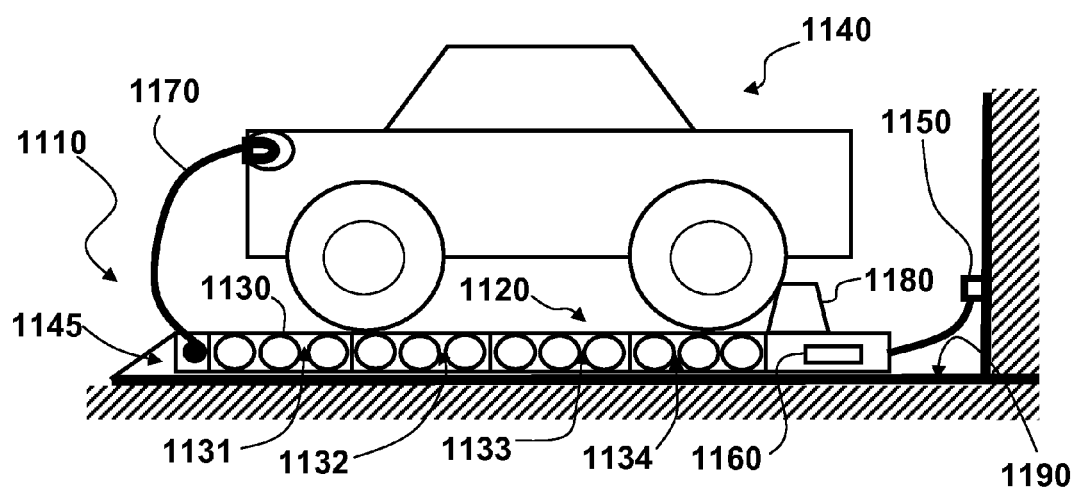
FIG. 11 depicts an exemplary charging system embodiment comprising battery elements disposed in a planar array of a platform housing configured to receive an electric vehicle for charging.

FIG. 11 depicts an exemplary charging system embodiment 1110 comprising battery elements disposed in a planar array 1120 of a platform housing 1130 configured to receive an electric vehicle 1140 for charging. The platform housing 1130 may be configured as modules 1131-1134 shown by example in FIG. 11 as four modules. The exemplary charging system 1110 is shown connected to a wall outlet 1150 of a residential or business garage. The platform housing 1130 is depicted as disposed on a surface 1190 that may be a concrete slab or other material that may provide for a thermal sink. A processing unit 1160 may be disposed within the exemplary embodiment proximate to the wall outlet 1150. The charging cable 1170 may payout from a cavity 1145 formed by the ramp portion. A charging lockout may be included based on sensed vehicle weight on the platform and/or contract with an optional tire stop 1180.

Figure 12:
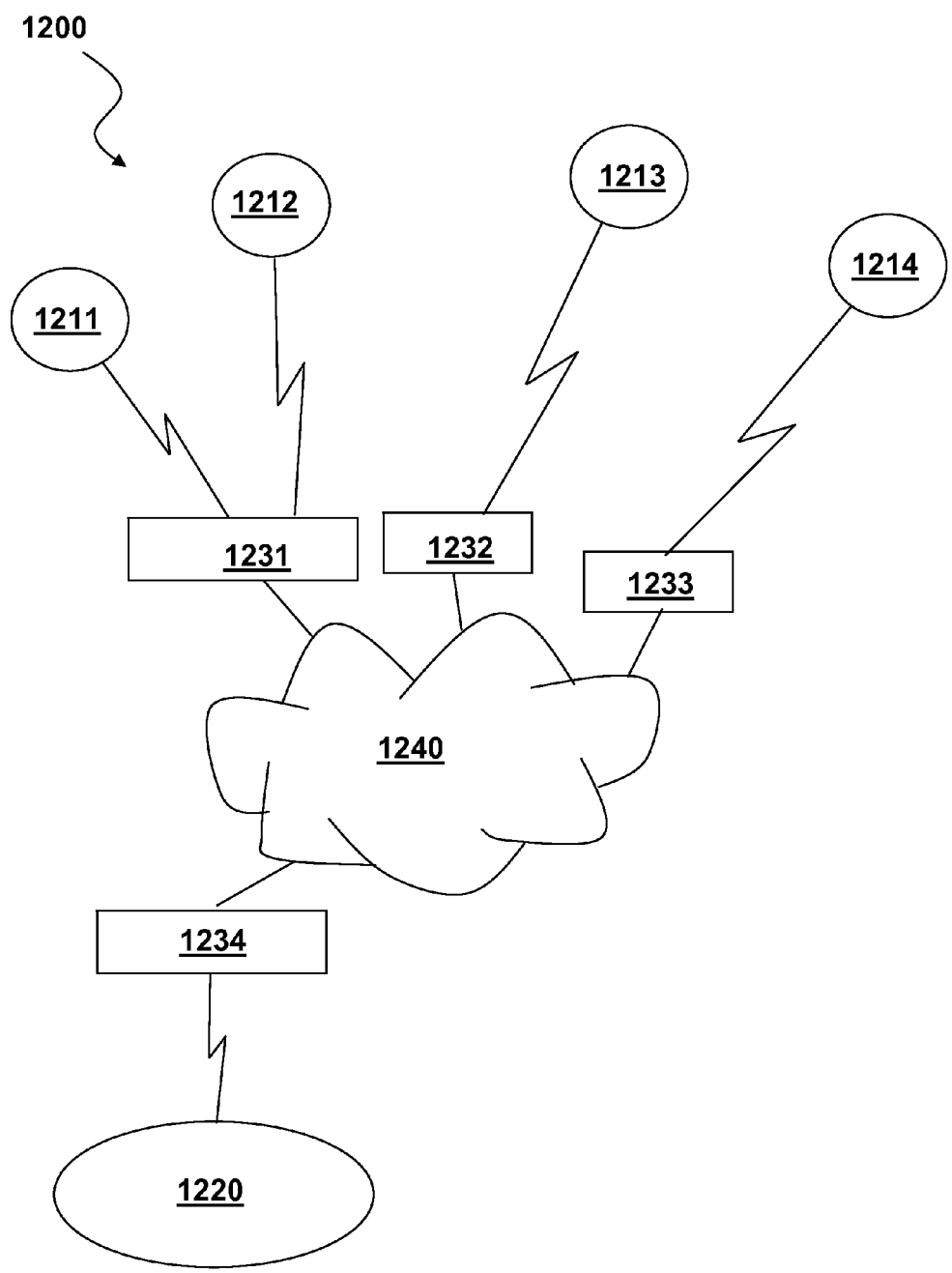
FIG. 12 illustrates an exemplary top-level communication network wherein a plurality of charging system embodiment nodes are depicted in communication with a coordination/data-gathering node.

FIG. 12 illustrates an exemplary top-level communication network 1200 wherein a plurality of device embodiment nodes 1211-1214 are depicted in communication with a coordination/data-gathering node 1220 via internet gateways/routers 1231-1234 and the Internet 1240. Transmittable data may include battery, voltage, current, or other element status conditions of and from one or more charging system embodiments configured for transmission of such data via, for example, wireless means including Wi-Fi and cellular telephone networks. Alternate embodiments of devices, e.g., a detachable charging module of a charging system as detached and wired at a charging location, may include direct (wired) Ethernet cabling and connections configured for wired communication to an exemplary coordination/data-gathering node 1220.

Exemplary Method Embodiments

Figure 13:
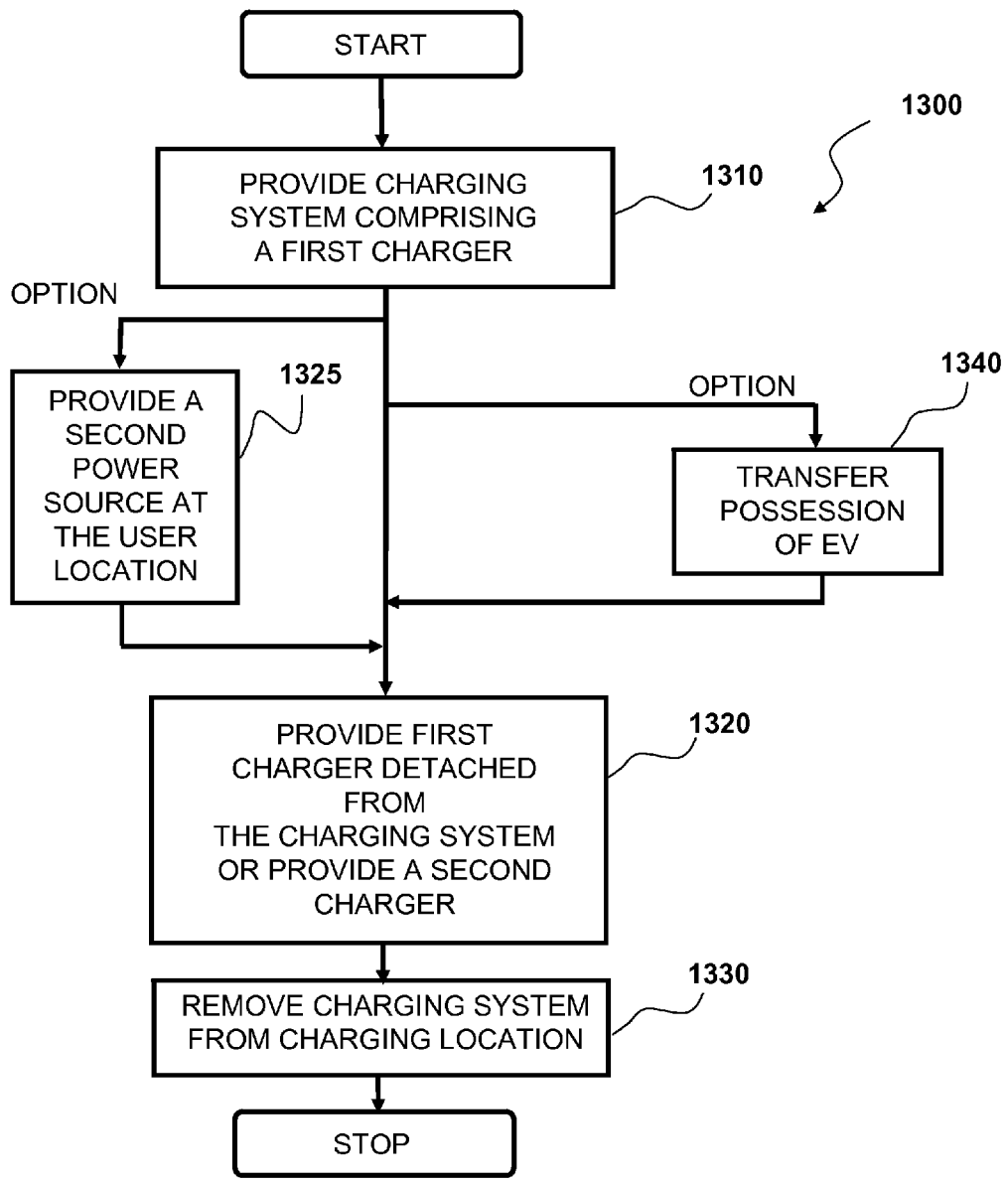
FIG. 13 is a top-level flowchart that illustrates an exemplary method embodiment of the present invention.

FIG. 13 is a top-level flowchart 1300 that illustrates an exemplary method embodiment of the present invention. The exemplary method may include: providing or delivering to a user location (step 1310) a charger system comprising a first charger, where the charging system is configured to store power supplied from a first power source of a first power level, and the first charging system is configured to supply power to the EV at a second power level greater than the first power level; providing or delivering to the user location (step 1320) either the first charger detached from the charging system and/or a second charger capable of charging the EV at a power level greater than the first power level, and optionally removing from the user location (step 1330) the charging system with first charger or without the first charger if detached. The exemplary method may further include an optional step of: transferring possession of the EV to the user (step 1340). The step of transferring possession of the EV to the user may comprise at least one of: (a) possession via a lease instrument; (b) possession via a bill of sale; and/or (c) possession via a bailment. In some embodiments of the exemplary method, the charging system may be configured to store energy supplied from a 110 VAC power line or a 120 VAC power line, and the charging system may be configured to supply power to the EV via at least one of: (a) level 2 AC-to-DC charging ranges; and/or (b) level 3 DC-to-DC charging ranges. In other embodiments of the exemplary method, the charging system may be configured to store energy supplied from a 220 VAC power line or a 240 VAC power line, and the charging system may be configured to supply power to the EV via at level 3 DC-to-DC charging ranges. In embodiments of the exemplary method, the method may optionally include providing a second power source at the user location (step 1325), wherein the second power source is capable of providing power at a level greater than the first power level of the first power source, and wherein either the first charger detached from the charging system and/or the second charger would be attached to the second power source.

The providing of the second power source may occur after the providing of the charging system (step 1310) and/or prior to the providing the first charger detached from the charging system or providing the second charger (step 1320). In at least one embodiment the second power source is either a 220 VAC power line or a 240 VAC power line.

In embodiments of the exemplary method, transferring the possession of the EV (step 1340) could occur prior to, or after, any of the steps of any of the embodiments of the method.

In some methods, the charging system and/or charger is sold to a utility operator, the utility delivers the charging equipment and adds the cost of the charging system and/or charger to the customer's electrical bill over a defined period of time. In some methods, to avoid or minimize smartgrid upgrades (due to peak leveling) and to avoid or minimize distribution grid infrastructure improvements, such as transformers that service a residential block, the charging system and/or charger may be sold to a utility operator and the utility operator thereafter may share some or all of the costs with the charging customer. In some embodiments, a utility operator may install the charging system and/or charger at the local site of the user, and thereafter the utility operator owns and rate-based the charging system and/or charger as a utility asset (in order to avoid distribution system upgrade and uses it as part of distributed storage network). In some methods, the charging system and/or charger may identify the car's owner when it is charging and effects billing inputs to the owner's home electricity bill. For example, if the charging system and/or charger is installed or otherwise disposed in a common parking garage or public place, the charging-related information may be relayed via secured wired and/or wireless communication links. In some embodiments, a third party may procure the charging system and/or charger, and may claim one or more available tax credit benefits (e.g., energy storage tax credit and charging infrastructure tax credit) and may then lease the charging system and/or charger as equipment to the end-user for charging.

In some methods the costs of possession (either ownership and/or rental/lease) of charging system may be incorporated (in whole or part) into transferring possession of the EV to the user, which may be via: (a) a lease instrument; (b) a bill of sale; and/or (c) a bailment.

Figure 14:
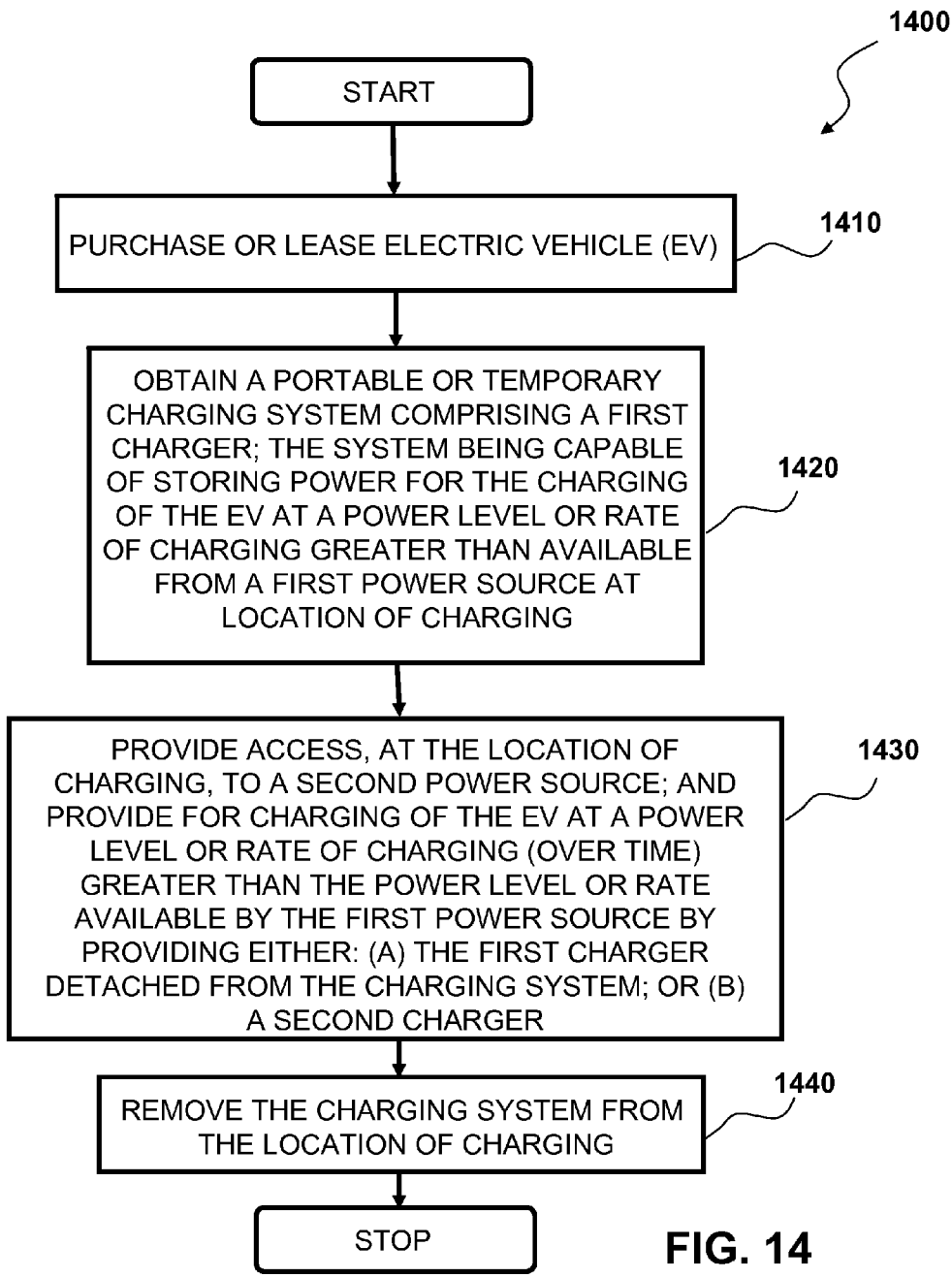
FIG. 14 is a top-level flowchart that illustrates an exemplary method embodiment of the present invention.

FIG. 14 is a top-level flowchart 1400 that illustrates an exemplary method embodiment of the present invention. The exemplary method may include: an optional step of purchasing or leasing an electric vehicle (step 1410); obtaining a portable, temporary, or detachably power-grid-connectable, charging system for a location or site of charging, the charging system may be configured for storing energy and providing power, via a first charger (which may be detachable from the charging system), to charge the EV at a power level or recharge rate over time greater than that available via the EV drawing directly from a first power source, e.g., an available power grid at the location of charging (e.g., a conditioned 110 VAC powerline or 120 VAC powerline) (step 1420); installing or providing at the location of charging a second power source, e.g., a conditioned 220 VAC powerline or 240 VAC powerline, and providing at least one of: (a) the first charger detached from the charging system and (b) a second charger, e.g., an EVSE, where the second charger is configured to charge the EV at a power level or recharge rate (over time) greater than that available via the EV drawing directly from the first power source, e.g., the available power grid at the location of charging (step 1430); and the optional step of removing the charging system with, or without, the first charger from the location of charging (step 1440).

In embodiments of the exemplary method, an optional step of purchasing or leasing an electric vehicle (step 1410) may occur prior to, or after, any of the steps of any of the embodiments of the method.

Exemplary method embodiments of provisioning an energy store and electric vehicle recharger detachably drawing from a power source apparatus may comprise: (a) providing the apparatus to a subscriber; (b) determining upfront, periodic, and/or termination payment obligations of the subscriber where some embodiments may be based on a stored energy tax credit, an EV charger tax credit, and/or a discounted power rate for charging an EV via the apparatus; and (c) withdrawing the apparatus from the subscriber based on a satisfied condition or exceeded threshold.

Figure 15:
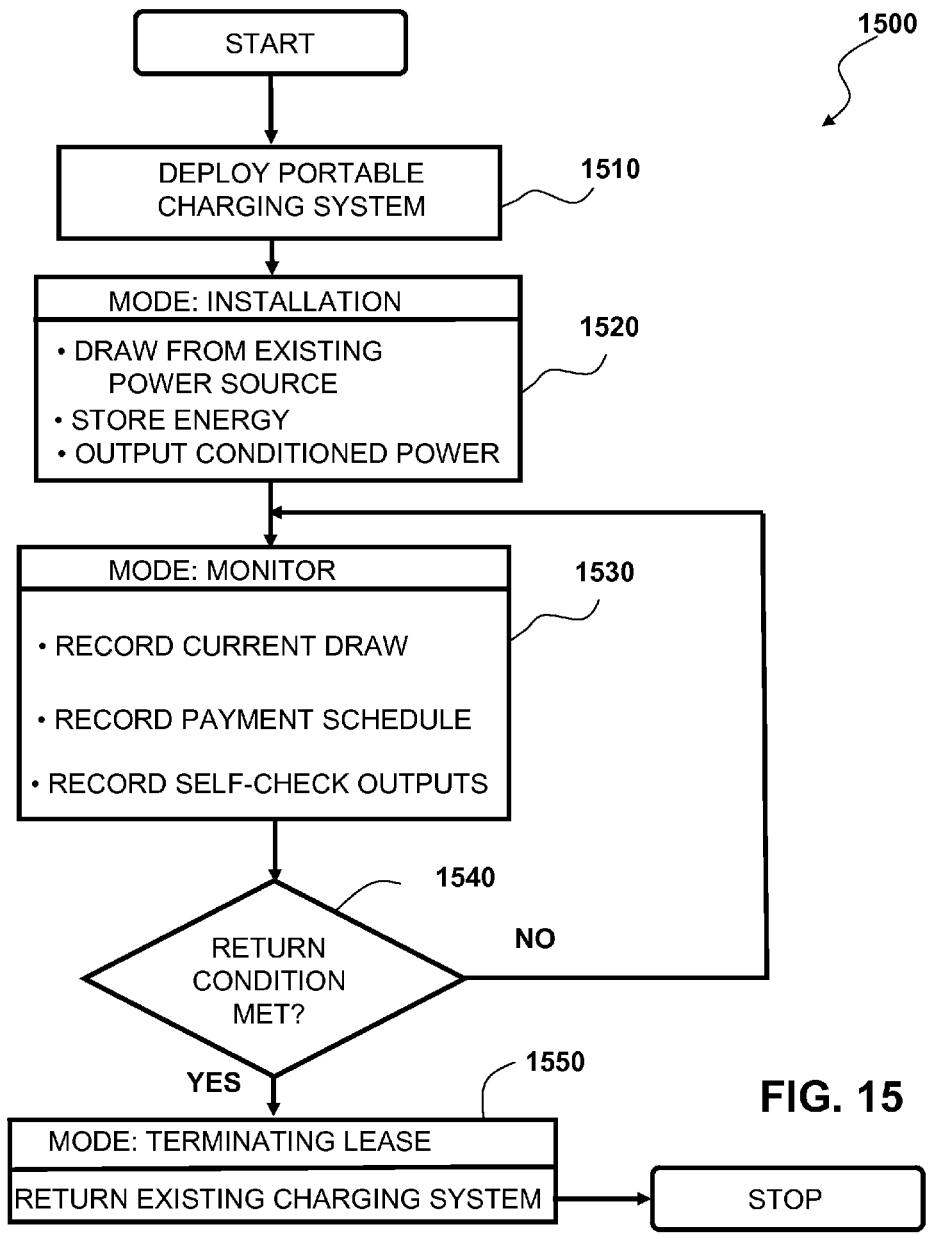
FIG. 15 is a top-level flowchart that illustrates an exemplary method embodiment of the present invention.

FIG. 15 is a top-level flowchart 1500 that illustrates an exemplary method embodiment of the present invention. An exemplary portable device, or charging system (see FIGS. 3A and 11), may be deployed (step 1510), in for example, a residential garage housing an electric vehicle. Installation (step 1520) may comprise plugging the exemplary portable charger into a residential 110 VAC outlet. If not already charged, the energy store may thereafter begin to draw power from the electrical grid to charge. The current draw from the electrical grid may be monitored (step 1530) and recorded by the device or off-board. The device or an off-board device may provide diagnostic metrics and these metrics of self-check outputs may be monitored and recorded by the device or off-board. If the device is leased, the payment schedule may be based on usage and may include discounts for use and/or when in the diurnal cycle and/or weekly cycle that the energy store draws power. The continuation of the exemplary provisioning may be based on one or more return conditions being unmet. Accordingly, if a return condition is met (test 1540), then the charger may be returned (step 1550) or otherwise removed from the erstwhile provisioned site or party/user. Exemplary return conditions may include: (a) the provisioning of a level 2 and/or level 3 charge apart from the charging system; (b) the installation of a hardwired, or otherwise fixedly attached, level 2 and/or level 3 charger; (c) providing a replacement detachable charging device. e.g., a level 3 charger available for replacing a level 2 charger; (d) removal, from the device, of a detachable level 2 charger for wiring at the site of installation; (e) failure of the present charging system; and/or (f) failure of the user or site manager to satisfy a lease obligation.

Figure 16:
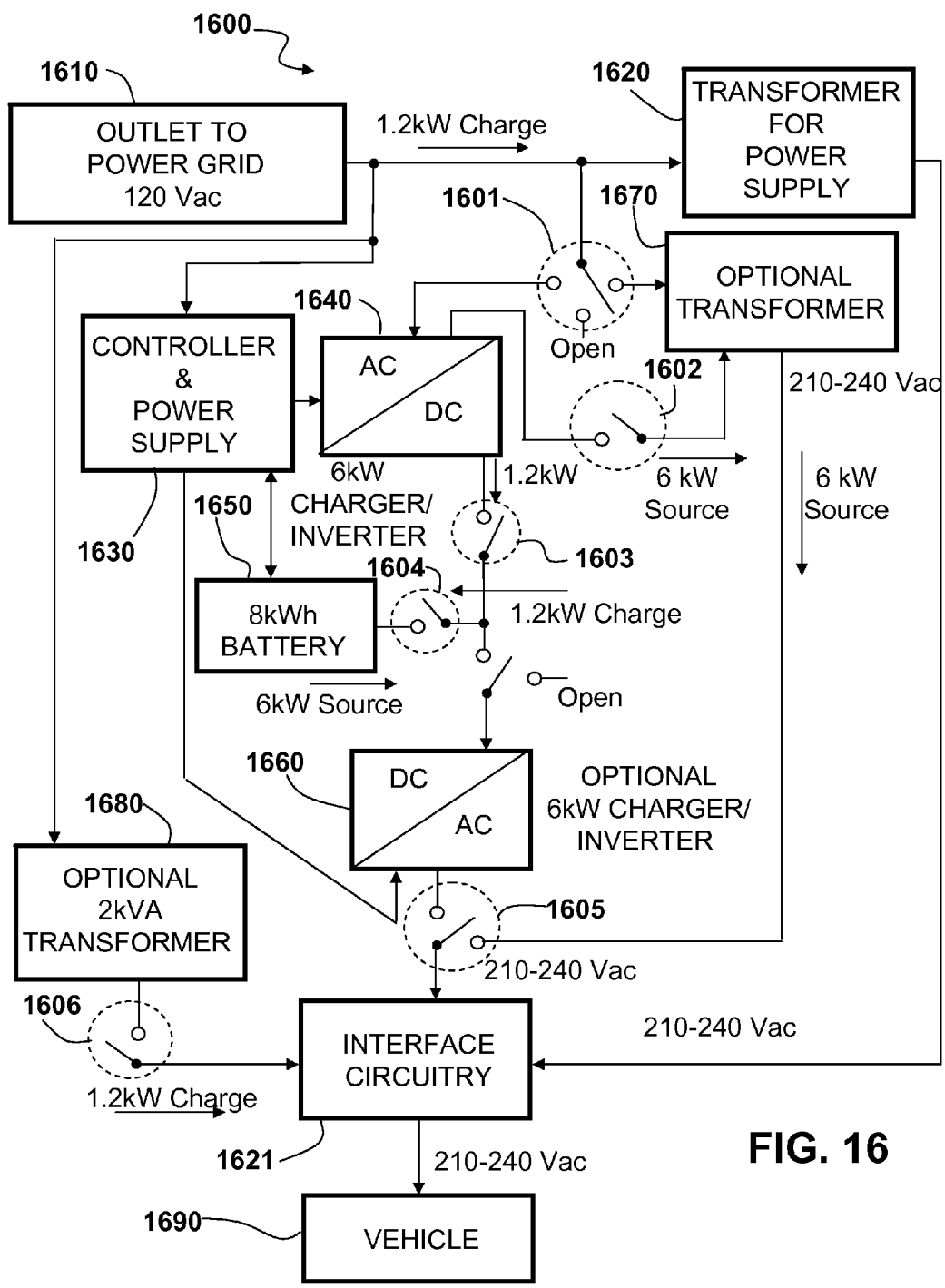
FIG. 16 depicts a functional block diagram of an exemplary embodiment of the present invention.

FIG. 16 depicts a functional block diagram of an exemplary embodiment 1600 of the present invention where one or more elements are optional. The interface circuitry 1621 conditions 210-240 VAC so that it may be provided to a vehicle 1690 configured to received a charging source. The interface circuitry 1621 is depicted as receiving 210-240 VAC from an optional transformer or an optional charger inverter where the source may be the 120 VAC power grid, the energy store of a battery, or both. An outlet 1610 to the power grid is depicted as providing 120 VAC when engaging the local grid. The output of the outlet is depicted as providing 120 VAC to: (a) a transformer 1620 for a 210-240 VAC power supply of interface circuitry 1621; (b) a controller 1630 and its 120 VAC power supply. The controller 1630 is depicted as controlling a first 6 kW charger/inverter 1640, and 8 kWh battery 1650, and second 6 kW charger/inverter 1660, where the second 6 kW charger/inverter 1660 is an optional element when the first optional transformer 1670 is included in the embodiment. The embodiment 1600 may include a second optional transformer 1680 whether or not the first optional transformer 1670 is included. Accordingly, by directly wiring elements and/or setting the exemplary switches 1601-1606, power to the interface circuitry 1621 may be provided.

Figure 17A:
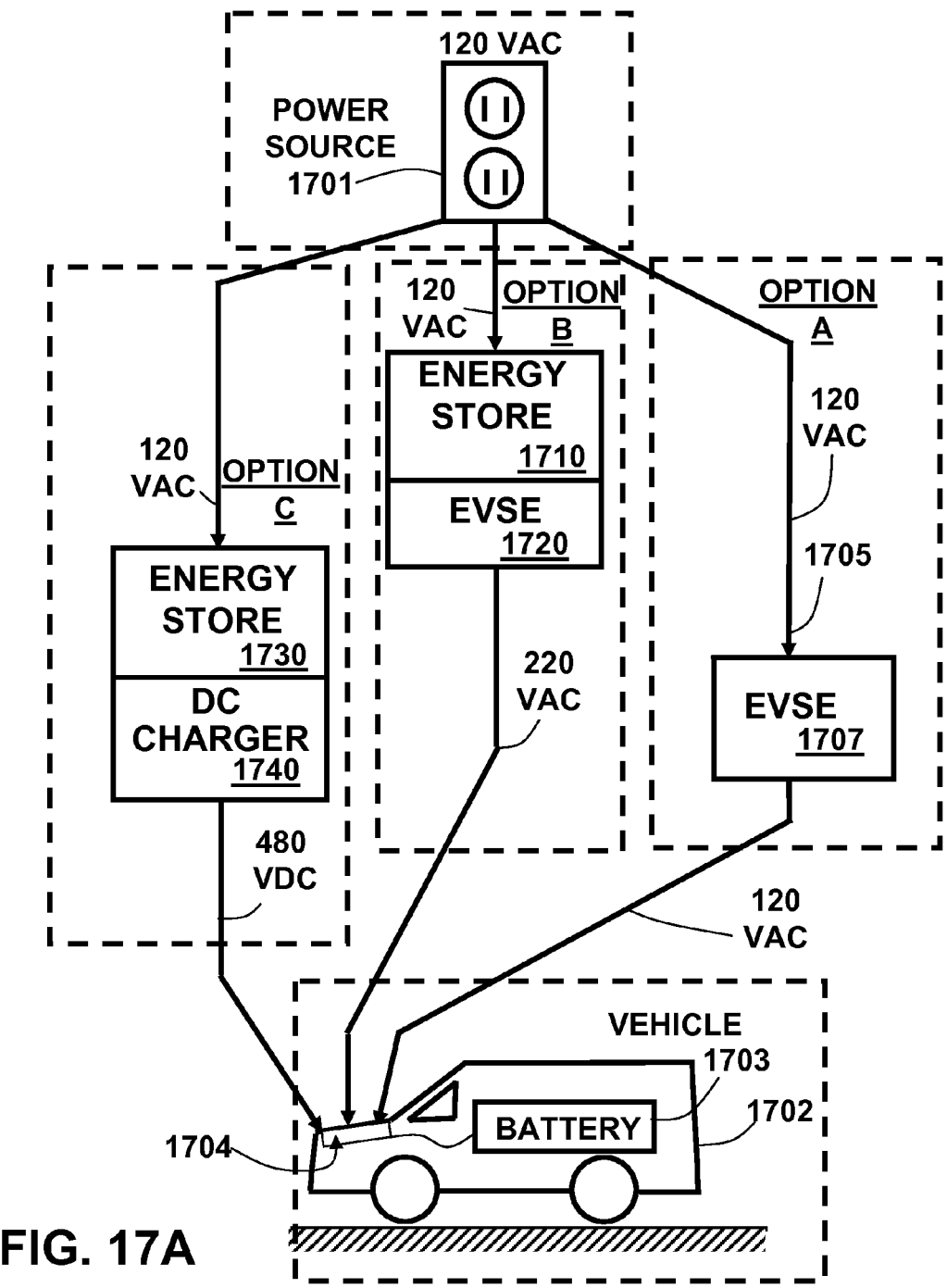
FIGS. 17A and 17B depict options of charging at a battery store of a vehicle.
Figure 17B:
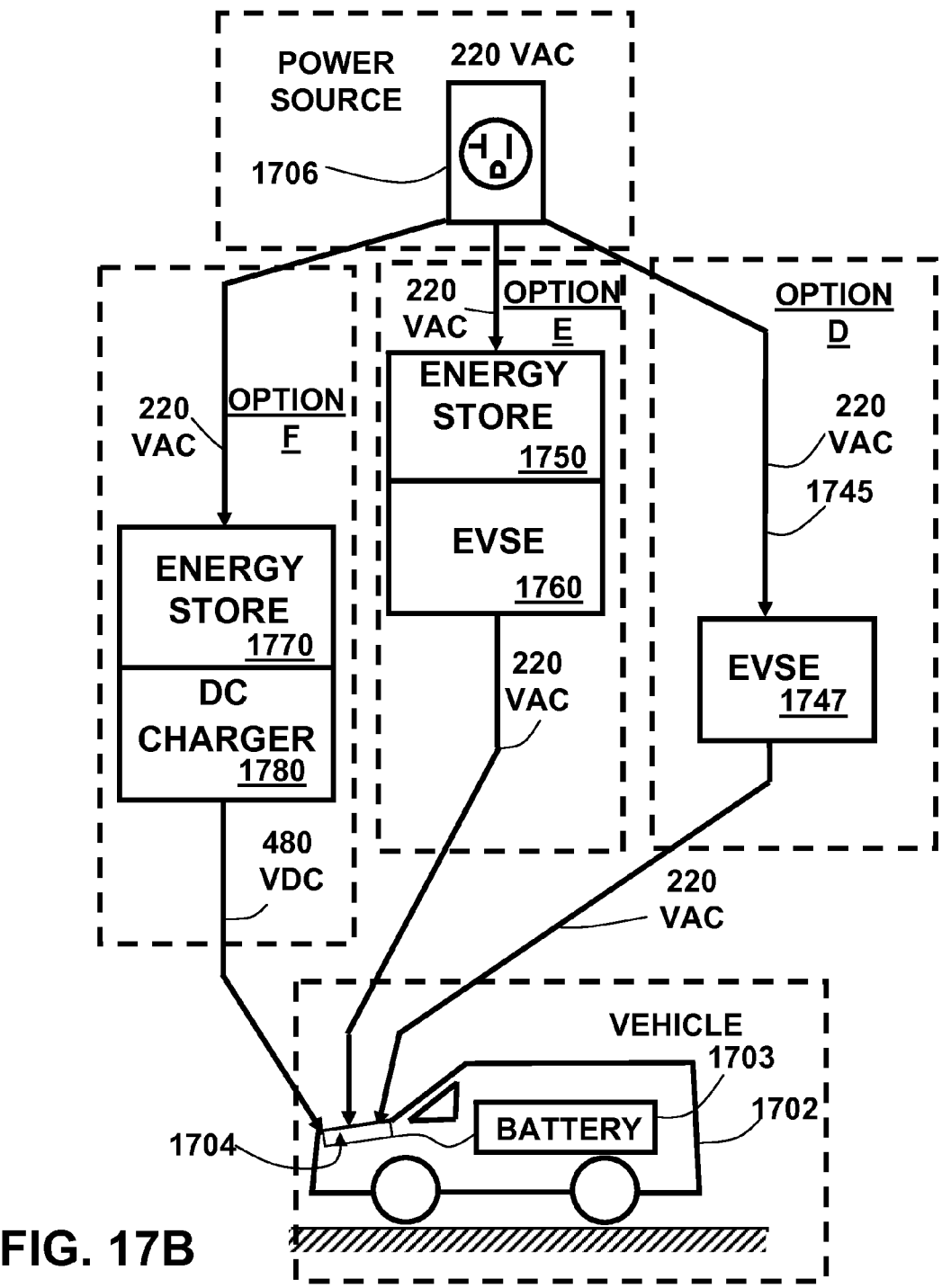

FIGS. 17A and 17B depict options of charging at a battery store of a vehicle. Referring to FIG. 17A, an exemplary path from a 120 VAC power source 1701 to a charging receptacle 1704 of a vehicle 1702 having a rechargeable battery 1703 is illustrated in Option A comprising interface circuitry such as an EVSE 1707 that outputs power via a 120 VAC power line to the vehicle 1703. Another exemplary path, Option B, is depicted as comprising an energy store 1710 and interface circuitry such as an EVSE 1720 whereby a 220 VAC power line is provided to the vehicle 1703 drawing on the stored energy of the energy store 1710 and/or transformed power drawn from the power source 1701. Another exemplary path, Option C, is depicted as comprising an energy store 1730 configured to convert the 120 VAC power to DC for storage, and a DC charger 1740 whereby a 480 VDC power line is provided to the vehicle 1703 drawing on the stored energy of the energy store 1740. Referring now to FIG. 17B, an exemplary path from a 220 VAC power source 1706 to the charging receptacle 1704 of a vehicle 1702 having a rechargeable battery 1703 is illustrated in Option D comprising interface circuitry such as an EVSE 1747 that outputs power via a 220 VAC power line to the vehicle 1703. Another exemplary path, Option E, is depicted as comprising an energy store 1750 and interface circuitry such as an EVSE 1760 whereby a 220 VAC power line is provided to the vehicle 1703 drawing on the stored energy of the energy store 1750 and/or transformed power drawn from the power source 1706. Another exemplary path, Option F, is depicted as comprising an energy store 1770 configured to convert the 220 VAC power to DC for storage, and a DC charger 1780 whereby a 480 VDC power line is provided to the vehicle 1703 drawing on the stored energy of the energy store 1770.

Electric Vehicle Charging Example 1

In some embodiments, an electric vehicle with a 40 miles range with the range based on 4.5 miles per kilo Watt hour (kWh) with an on-board charger (OBC) power output of 3.30 kW, such as the vehicle 1702, may be shown in FIG. 17A. Where the wall power is 1.3 kW, such as that shown with the power source 1701 at 120 VAC, and a home charging appliance having a battery of 5 kWh, such as that shown as the energy store 1710, the vehicle charge time is about 5 hours.

Electric Vehicle Charging Example 2

In some embodiments, given the electric vehicle of Example 1 above, where the wall power is 1.3 kW and the home charging appliance has a battery of 8 kWh, the vehicle charge time is about 4 hours.

Electric Vehicle Charging Example 3

In some embodiments, given the electric vehicle of Example 1 above, where the wall power is 1.3 kW and the home charging appliance has a battery of 2 kWh, the vehicle charge time is about 6 hours.

Electric Vehicle Charging Example 4

In some embodiments, given the electric vehicle of Example 1 above, where the wall power is 1.3 kW, without a home charging appliance (e.g. no energy store) but just an EVSE, such as Option A shown in FIG. 17A with the EVSE 1707, the charge time is about 8 hours.

Electric Vehicle Charging Example 5

In some embodiments, given the electric vehicle of Example 1 above, where the wall power is 3.3 kW, such as that shown in FIG. 17B with the power source 1706 at 220 VAC, without a home charging appliance (e.g. no energy store) but just an EVSE, such as Option D, the charge time is about 2.7 hours.

Electric Vehicle Charging Example 6

In some embodiments, an electric vehicle with a 40 miles range with the range based on 4.5 miles per kilo Watt hour (kWh) with an on-board charger (OBC) power output of 6.60 kW, such as the vehicle 1702, may be shown in FIG. 17B. Where the wall power is 3.3 kW, such as that shown with the power source 1706 at 220 VAC, and a home charging appliance having a battery of 5 kWh, such as that shown as the energy store 1750, the vehicle charge time is about 2.1 hours.

Electric Vehicle Charging Example 7

In some embodiments, given the electric vehicle of Example 6 above, where the wall power is 3.3 kW and the home charging appliance has a battery of 8 kWh, the vehicle charge time is about 1.75 hours.

Electric Vehicle Charging Example 8

In some embodiments, given the electric vehicle of Example 6 above, where the wall power is 3.3 kW and the home charging appliance has a battery of 2 kWh, the vehicle charge time is about 2.5 hours.

Electric Vehicle Charging Example 9

In some embodiments, given the electric vehicle of Example 6 above, where the wall power is 3.3 kW, without a home charging appliance (e.g. no energy store) but just an EVSE, such as Option D shown in FIG. 17B with the EVSE 1747, the charge time is about 2.7 hours.

In other embodiments, a charging system may be connected to a power source, wherein the power source is capable of providing sufficient power to charge an electric vehicle in a first period of time, comprising: an energy store electrically connected to the power source, such that the energy store may store power provided by the power source; a charger electrically connected to the energy store, wherein the charger is capable of providing sufficient power to charge the electric vehicle in a second period of time; and wherein the second period of time is shorter than the first period of time. Additionally, the charging system may have an energy store that comprises a reversible chemical energy store, that may comprise at least one of: a lead-acid battery and a lithium-ion battery or lithium-ion or lead-acid battery. The energy store may also comprise one or more modules disposed on a heat sinking surface, each module comprising a reversible chemical energy store, wherein the energy store may comprise at least one of: a lead-acid battery and a lithium-ion battery or lithium-ion or lead-acid battery. In other embodiments, the charging system may have a power source that provides power via at least one of: between about 110 volts and 120 volts, about 120 volts and about 16 amps, about that of a common United States grounded household receptacle, about 16.8 kW, and/or alternating current, and the charger is capable of providing power to the electric vehicle at least one of: a voltage between about 208 volts and 240 volts, between about 208 volts and 240 volts and between about 12 amps and about 80 amps, between more than 16.8 kW and about 44 kW, and/or alternating current. Additionally, the charging system power source may provide power via at least one of: a voltage between about 208 volts and 240 volts, between about 208 volts and 240 volts and between about 12 amps and about 80 amps, between more than 16.8 kW and about 44 kW, and/or alternating current, and the charger is capable of providing power to the electric vehicle at least one of: a voltage between about 300 and 500 volts, a voltage of about 480 volts, a current at about up to 400 amps, about 62.5 kW and/or direct current.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:
1. A device comprising:
an electrical input configured to detachably connect to a power source;
an electrical output module configured to charge and detachably connect to an electric vehicle (EV);
an energy store configured to detachably connect to the EV and store power provided by the power source; and wherein the energy store is configured to store energy supplied from the electrical input having a first power level and the electrical output module is configured to, via the energy store, supply power to the EV at a second power level, wherein the second power level is greater than the first power level.

2. The device of claim 1 wherein the output module is further configured to convert direct current from the energy store to alternating current.

3. The device of claim 1 wherein the output module is further configured to condition the direct current from the energy store to a higher powered direct current.

4. The device of claim 1 wherein the output module is configured to condition the direct current from the energy store to at least one of: (a) a higher powered direct current and (b) an alternating current.

5. The device of claim 1 wherein the energy store comprises a reversible chemical energy store, the energy store comprising a battery, wherein the battery is at least one of: (a) a lead-acid battery and a lithium-ion battery; (b) a lithium-ion battery; and (c) a lead-acid battery.

6. The device of claim 1 wherein the energy store comprises a plurality of capacitors.

7. The device of claim 1 wherein the energy store comprises a fuel cell.

8. The device of claim 1 further comprising a processor configured to monitor at least one of current and voltage within at least one circuit of the device.

9. The device of claim 1 further comprising a processor configured to monitor an energy store level and communicate the monitored energy store level to at least one of: a display and a wireless transmitter.

10. The device of claim 1 wherein the electrical output module is configured to detach from the device and connect to a power line having a voltage greater than the power source.

11. A method comprising:
providing an apparatus to a subscriber, the apparatus comprising: an electrical input configured to detachably connect to a power source; an electrical output module configured to charge and detachably connect to an electric vehicle (EV); an energy store configured to detachably connect to the EV and store power provided by the power source; and wherein the energy store is configured to store energy supplied from the electrical input having a first power level and the electrical output module is configured to, via the energy store, supply power to the EV at a second power level, wherein the second power level is greater than the first power level;
determining payment obligations of the subscriber for use of the provided apparatus; and
withdrawing from the subscriber the apparatus based on a termination condition.

12. A method comprising:
providing to a user location a charging system comprising a first charger external to an electric vehicle (EV) and the first charger comprising an energy store, wherein the charging system is configured to store energy supplied from a power source of a first power level and wherein the first charger is configured to supply power to the EV at a second power level greater than the first power level; and
providing at least one of: (a) the first charger detached from the charging system; and (b) a second charger configured to charge the EV at a power level greater than the first power level.

13. The method of claim 12 further comprising the step of removing from the user location the charging system.

14. The method of claim 12 further comprising the step of removing from the user location the charging system without the detached first charger.

15. The method of claim 12 further comprising the step of: transferring possession of the EV to the user.

16. The method of claim 15 wherein the step of transferring possession of the EV to the user comprises at least one of: (a) possession via a lease instrument; (b) possession via a bill of sale; and (c) possession via a bailment.

17. The method of claim 12 wherein the charging system is configured to store energy supplied from at least one of: a 110 VAC power line and a 220 VAC power line.

18. The method of claim 12 wherein the charging system is configured to supply power to the EV at least one of: (a) AC-to-DC charging ranges; and (b) DC-to-DC charging ranges.

19. The method of claim 12 wherein the first charger comprises an AC-to-DC charging module configured to be detachable from the first charger;
the method further comprising the steps of: (a) detaching the AC-to-DC charging module from the charging system; and (b) wiring, proximate to the user location, the detached AC-to-DC charging module to an AC power line.

20. The method of claim 19 further comprising the step of removing the charging system from the user location after the AC-to-DC charging module is detached from the first charger.

21. The method of claim 12 wherein the charging system is configured to store energy supplied from an alternating current power source.

22. A method comprising:
providing at a location of charging a charging system external to an electric vehicle (EV), the system an energy store, and wherein in system is configured to be detachably connectable to a first power source and configured for storing energy and comprising a first charger configured for providing power to charge the EV at greater than at least one of: (a) a power level; and (b) a recharge rate over time, available to the EV by the EV drawing directly from the first power source at the location of charging; and
providing at the location of charging a second power source, and at least one of: (a) the first charger detached from the charging system; and (b) a second charger, the second charger configured to charge the EV at greater than at least one of: (a) a power level; and (b) a recharge rate over time, available via the EV drawing directly from the first power source at the location of charging.

23. The method of claim 22 further comprising purchasing the electric vehicle to be charged at the location of charging.

24. The method of claim 22 further comprising leasing the electric vehicle to be charged at the location of charging.

25. The method of claim 22 further comprising removing from the location of charging the charging system after the second charger is provided.

26. The method of claim 22 wherein the charging system comprises a charging module comprising the first charger, a processor and addressable memory, the charging module configured to be detachable from the charging system; the method further comprising the steps of: (a) detaching the charging module from the first charger; (b) providing the detached charging module; and (c) wiring the charging module to an AC power line proximate to the location of charging.

27. The method of claim 26 further comprising the step of removing the charging system from the location of charging after the charging module is detached from the first charger.

28. A charging system comprising:
a first charger comprising an energy store, the first charger detachably connected to an electric vehicle (EV), and wherein the charging system is configured to store energy supplied from a power source of a first power level and wherein the first charger is configured to, via the energy store, supply power to an EV at a second power level greater than the first power level.

29. A charging system of claim 28 further comprising a second charger configured to charge the EV at a power level greater than the first power level.

30. The charging system of claim 28 wherein the first charger is further configured to convert direct current from the energy store to alternating current.

31. The charging system of claim 28 wherein the first charger is further configured to condition the direct current from the energy store to a higher powered direct current.

32. The charging system of claim 28 wherein the first charger is configured to condition the direct current from the energy store to at least one of: (a) a higher powered direct current and (b) an alternating current.

33. The charging system of claim 28 wherein the energy store comprises a reversible chemical energy store, the energy store comprising a battery, wherein the battery is at least one of: (a) a lead-acid battery and a lithium-ion battery; (b) a lithium-ion battery; and (c) a lead-acid battery.

34. The charging system of claim 28 wherein the energy store comprises one or more modules disposed on a heat sinking surface, each module comprising a reversible chemical energy store, the energy store comprising a battery, wherein the battery is at least one of: (a) a lead-acid battery and a lithium-ion battery; (b) a lithium-ion battery; and (c) a lead-acid battery.

35. A charging system connected to a power source, the charging system external to an electric vehicle and detachably connectable to the electric vehicle, and wherein the power source is capable of providing sufficient power to charge the electric vehicle in a first period of time, comprising:
an energy store electrically connected to the power source, such that the energy store can store power provided by the power source;
a charger electrically connected to the energy store, wherein the charger is capable of providing sufficient power, via the energy store, to charge the electric vehicle in a second period of time; and
wherein the second period of time is shorter than the first period of time.

36. The charging system of claim 35 wherein the energy store comprises a reversible chemical energy store, the energy store comprising a battery, wherein the battery is at least one of: (a) a lead-acid battery and a lithium-ion battery; (b) a lithium-ion battery; and (c) a lead-acid battery.

37. The charging system of claim 35 wherein the energy store comprises one or more modules disposed on a heat sinking surface, each module comprising a reversible chemical energy store, the energy store comprising a battery, wherein the battery is at least one of: (a) a lead-acid battery and a lithium-ion battery; (b) a lithium-ion battery; and (c) a lead-acid battery.

38. The charging system of claim 35 wherein the power source provides power at least one of: between about 110 volts and 120 volts or about 120 volts and about 16 amps or about that of a common United States grounded household receptacle or about 16.8 kW or alternating current, and the charger is capable of providing power to the electric vehicle at least one of: a voltage between about 208 volts and 240 volts or between about 208 volts and 240 volts and between about 12 amps and about 80 amps or between more than 16.8 kW and about 44 kW or alternating current.

39. The charging system of claim 35 wherein the power source provides power at least one of: a voltage between about 208 volts and 240 volts or between about 208 volts and 240 volts and between about 12 amps and about 80 amps or between more than 16.8 kW and about 44 kW or alternating current, and the charger is capable of providing power to the electric vehicle at least one of: a voltage between about 300 and 500 volts or a voltage of about 480 volts or a current at about up to 400 amps or about 62.5 kW or direct current.

* * * * *